US012789132B2

(12) United States Patent
Feron et al.

(10) Patent No.: US 12,789,132 B2
(45) Date of Patent: Nov. 10, 2026

(54) VAPOUR COMPRESSION FOR REGENERATION OF A CAPTURE MEDIUM RICH IN A CAPTURED TARGET GAS

(71) Applicant: COMMONWEALTH SCIENTIFIC AND INDUSTRIAL RESEARCH ORGANISATION, Acton (AU)

(72) Inventors: Paul Feron, Cameron Park (AU); Kangkang Li, Mayfield West (AU); Ali Kiani, Mayfield West (AU)

(73) Assignee: Commonwealth Scientific and Industrial Research Organisation, Acton (AU)

(*) Notice: Subject to any disclaimer, the term of this patent is extended or adjusted under 35 U.S.C. 154(b) by 244 days.

(21) Appl. No.: 18/840,404

(22) PCT Filed: Feb. 20, 2023

(86) PCT No.: PCT/AU2023/050110
§ 371 (c)(1),
(2) Date: Aug. 21, 2024

(87) PCT Pub. No.: WO2023/159264
PCT Pub. Date: Aug. 31, 2023

(65) Prior Publication Data
US 2025/0153093 A1 May 15, 2025

(30) Foreign Application Priority Data
Feb. 23, 2022 (AU) ................................ 2022900421

(51) Int. Cl.
*B01D 53/14* (2006.01)

(52) U.S. Cl.
CPC ..... *B01D 53/1425* (2013.01); *B01D 53/1475* (2013.01); *B01D 53/1493* (2013.01);
(Continued)

(58) Field of Classification Search
CPC ............ B01D 53/1425; B01D 53/1475; B01D 53/1493; B01D 2252/20494; B01D 2257/504; B01D 2259/4009
See application file for complete search history.

(56) References Cited

U.S. PATENT DOCUMENTS 2,176,441 A 10/1939 Ulrich et al.
4,160,810 A 7/1979 Benson et al.
(Continued)

FOREIGN PATENT DOCUMENTS

AU 552657 B2 6/1986
AU 2011203094 A1 7/2011
(Continued)

OTHER PUBLICATIONS

English Machine Translation of WO 2014175338 A1 (Year: 2014).*
(Continued)

*Primary Examiner* — Charles S Bushey
(74) *Attorney, Agent, or Firm* — Merchant & Gould P.C.

(57) ABSTRACT

A process of regeneration of a capture medium rich in a captured target gas including the steps of: heating a target gas rich capture medium including an absorbent medium, absorbed target gas and water using thermal energy, thereby facilitating the separation of the absorbed target gas from the capture medium into a gas containing vapour phase and a heated lean capture medium, the gas containing vapour phase including the target gas and water vapour having a steam fraction of at least 0.8; compressing at least one of: the gas containing vapour phase; or a vapour phase thermally associated with the gas containing vapour phase, to form a compressed vapour; and using the compressed vapour as a source of thermal energy to heat the target gas rich capture medium.

25 Claims, 6 Drawing Sheets

(52) U.S. Cl.
CPC .............. *B01D 2252/20494* (2013.01); *B01D 2257/504* (2013.01); *B01D 2259/4009* (2013.01)

(56) References Cited

U.S. PATENT DOCUMENTS

| | | | |
|---|---|---|---|
| 4,384,875 A | 5/1983 | Batteux et al. | |
| 7,901,489 B2 | 3/2011 | Jin et al. | |
| 8,920,548 B2 | 12/2014 | Hokari et al. | |
| 9,463,411 B2 | 10/2016 | Taniguchi et al. | |
| 10,010,826 B2 | 7/2018 | Okumura et al. | |
| 10,040,023 B2 | 8/2018 | Feron et al. | |
| 10,322,366 B2 | 6/2019 | Lee et al. | |
| 10,596,514 B2 * | 3/2020 | Kaseda .............. | B01D 53/1462 |
| 2010/0029466 A1 | 2/2010 | Woodhouse | |
| 2010/0062926 A1 | 3/2010 | Woodhouse et al. | |
| 2011/0088553 A1 | 4/2011 | Woodhouse et al. | |
| 2011/0277479 A1 | 11/2011 | Richter et al. | |
| 2012/0255306 A1 | 10/2012 | Iijima | |
| 2012/0312020 A1 | 12/2012 | Hume et al. | |
| 2013/0153400 A1 | 6/2013 | Hume et al. | |
| 2013/0177481 A1 | 7/2013 | Hokari et al. | |
| 2013/0206010 A1 | 8/2013 | Tijima et al. | |
| 2015/0233577 A1 | 8/2015 | Lijima | |
| 2016/0001223 A1 | 1/2016 | Okuno et al. | |
| 2018/0264404 A1 | 9/2018 | Mathias et al. | |
| 2021/0220771 A1 | 7/2021 | Lefebvre et al. | |

FOREIGN PATENT DOCUMENTS

| | | | |
|---|---|---|---|
| CA | 619193 A | | 4/1961 |
| WO | 2008/063079 A2 | | 5/2008 |
| WO | 2008/063082 A2 | | 5/2008 |
| WO | 2011/073672 A1 | | 6/2011 |
| WO | 2014/098154 A1 | | 6/2014 |
| WO | WO 2014175338 A1 | * | 10/2014 |

OTHER PUBLICATIONS

International Preliminary Report on Patentability issued in the corresponding PCT/AU2023/050110, Jun. 13, 2023.
International Search Report and Written Opinion issued in the corresponding PCT/AU2023/050110, Mar. 20, 2023.
Australian Search Report issued in the corresponding Australian Application No. 2022900421, Mar. 31, 2022.
European Search Report issued in the corresponding European Patent Application No. 23758215.0, Aug. 20, 2025, 14 pages.

* cited by examiner

VAPOUR COMPRESSION FOR REGENERATION OF A CAPTURE MEDIUM RICH IN A CAPTURED TARGET GAS

CROSS-REFERENCE TO RELATED APPLICATION

This application is a National Stage Application of International Patent Application No. PCT/AU2023/050110, filed Feb. 20, 2023, which claims the benefit of priority to Australian Patent Application No. 2022900421, filed Feb. 23, 2022, and both applications are incorporated herein by reference in their entirety. To the extent appropriate, a claim of priority is made to each of the above disclosed applications.

TECHNICAL FIELD

The present invention relates to a vapour compression system that supplies the thermal energy requirement for a regeneration of a capture medium rich in a captured target gas. The invention is particularly applicable to an acid gas capture/removal process, for example carbon dioxide ($CO_2$) capture, and it will be convenient to hereinafter disclose the invention in relation to that exemplary application. However, it is to be appreciated that the invention is not limited to that application and could be used in a variety of target gas capture and/or removal processes.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

The leading technology for $CO_2$-capture uses a liquid absorbent, for example, an amine solution, that will absorb $CO_2$ at low temperature and release $CO_2$ at high temperature as a result of heat input. Conventionally, the heat requirement of the regeneration process will be met by steam that is for example extracted from a steam cycle in case of $CO_2$-capture from power stations or provided by a separate boiler or heat available from another source.

A number of other prior $CO_2$ capture processes use compression of the vapour stream from the desorber with subsequent heat recovery to lower the thermal energy requirement for $CO_2$ desorption. A number of these process modifications incorporate compression of vapours from the loaded (rich) solutions or regenerated (lean) absorbent solutions, leading to a significant reduction in the heat requirement for the regeneration process.

WO2011/073672A1 describes one example of a system for the regeneration of a capture medium rich in a captured target gas that supplies the thermal energy required to heat the gas rich capture medium to dissociate into a gas rich vapour phase and a lean absorbent solution using a combination of thermal energy from vapour compression and a heat pump that recovers thermal energy from one or more sources of low-grade heat from several points of the capture process. Whilst vapour compression can be used to provide part of the thermal energy requirements for heating the rich absorbent solution in the reboiler, the process in WO2011/073672A1 requires the use of additional energy input to fully meet energy requirements of the reboiler.

Another example is described in United States patent publication No. 20160001223A1 which teaches a carbon dioxide recovery system that includes a regenerator arrangement which includes a compression driven energy recycling system connected to the top outlet of a regenerator. The compression energy recycle system improves the heat recovery efficiency by directly compressing the recovery gas discharged from the regenerator without subjecting the gas to condensation and separation of water vapour by the cooling process. However, the compression driven energy recycling system is not configured to supply all the energy requirements for the reboiler function at the base of the regenerator. Additional energy must be supplied to the reboiler by a steam heater/reboiler.

Thus, whilst previous process modifications, such as detailed in WO2011/073672A1 and US20160001223A1, show some energy savings through vapour compression and waste energy harvesting in the process, none of these processes provide a system that makes effective use of possible energy that can be derived from a vapour compression system. Ineffective use of that energy source requires these systems to source additional thermal energy from process lines or systems remote to the desorption process and equipment to complete the energy balance about the desorber.

It would therefore be desirable to provide a new or improved process for the regeneration of liquid absorbents that more effectively recovers heat from a vapour compression system for use in the regeneration of liquid absorbents.

SUMMARY OF THE INVENTION

A first aspect of the present invention provides a process of regeneration of a capture medium rich in a captured target gas comprising the steps of:

- heating a target gas rich capture medium comprising an absorbent medium, absorbed target gas and water using thermal energy, thereby facilitating the separation of the absorbed target gas from the capture medium into a gas containing vapour phase and a heated lean capture medium, said gas containing vapour phase comprising the target gas and water vapour having a steam fraction of at least 0.8;
- compressing at least one of: the gas containing vapour phase; or a vapour phase thermally associated with the gas containing vapour phase, to form a compressed vapour; and
- using the compressed vapour as a source of thermal energy to heat the target gas rich capture medium.

The present invention therefore provides a process/system for regeneration of capture mediums, such as liquid absorbents, used to capture a target as such as $CO_2$, which includes more effective heat recovery from its vapour compression process. That heat recovery is utilised in the heating step of the process to facilitate the separation of the absorbed target gas from the capture medium into a gas containing vapour phase and a heated lean capture medium. As will be explained in more detail, depending on the process embodiment, that heat may be used to preheat the target gas rich capture medium and/or may be used to heat the capture medium in a desorber (for example using a reboiler) through which the target gas rich capture medium is heated via heat transfer within that desorber.

The vapour compression process of the present invention is based on a high vapour content of the gas stream leaving the absorption liquid regeneration process. This is counter to conventional regeneration process designs which typically endeavour to minimise the vapour content as it presents a loss of energy. Such prior energy efficient liquid regeneration process concepts are based on the minimisation of the water content of the wet $CO_2$-product leaving the $CO_2$-desorber. These regeneration process designs fail to recognise the full benefits of the vapour compression process with a high vapour content.

Nevertheless, it should be appreciated that the process of the present invention preferably does not have significantly high vapour content. At high steam fractions the total amount of gas/vapour becomes large. This leads to a high compression energy per amount of $CO_2$ captured, but also a high amount of recoverable energy. The amount of recovered energy preferably should be such that it is sufficient to provide the thermal energy for the regeneration but no more than that. There is therefore a sweet spot in the range of steam fractions that can be used. It should be appreciated that the steam fraction is the fraction of water vapour (steam) in the overall vapour/gas mixture.

Therefore, in the present invention, the steam fraction in the exit stream of target gas separator needs to be high enough to enable significant recovery of latent heat in addition to recovery of the sensible heat. The inventors have found that this requires a steam fraction of at least 0.8, preferably above 0.85, and more preferably above 0.9. The Inventors are not aware of any prior art arrangement that includes these unique and advantageous process conditions that utilise this particular steam fraction range in the exit stream of a target gas separator to provide more effective heat recovery for the vapour compression step (vapour compression energy recovery system). In embodiments, the gas containing vapour phase comprises the target gas and water vapour having a steam fraction of between 0.8 to 0.999. In embodiments, the gas containing vapour phase comprises the target gas and water vapour having a steam fraction of between 0.8 to 0.999, and more preferably a steam fraction of between 0.8 to 0.99, and yet more preferably between 0.9 and 0.99. In some embodiments, the target gas and water vapour have a steam fraction of between 0.9 to 0.999, and preferably between 0.95 to 0.999. In some embodiments, the target gas and water vapour have a steam fraction of between 0.8 to 0.995, preferably between 0.9 to 0.995. In embodiments, the gas containing vapour phase comprises the target gas and water vapour having a steam fraction of at least 0.9.

The required steam content of the gas containing vapour phase can be expressed as a steam to target gas ratio. In this context, the gas containing vapour phase comprising the target gas and water vapour has a steam/target gas ratio of preferably at least 4, more preferably at least 8, and yet more preferably at least 10. In embodiments, the steam/target gas ratio is preferably from 4 to 1000.

The vapour compression component of the process of the present invention relies on a high vapour content in the exhaust vapour stream which is subsequently compressed with heat recovery into the regeneration process that enables more effective heat recovery from that compressed vapour. It should be appreciated that external energy input is still required in the process/system of the present invention run the vapour compression system. Here, electricity can be used to run the compressors therein. The process therefore enables the use of electricity to run the thermal absorption liquid regeneration in a liquid absorbent-based $CO_2$-capture process. This is particularly useful for direct air capture that can then be completely operated on renewable energy. This advantageously avoids the use of heat for liquid absorbent regeneration which might not be available in the process, an adjoining process, or the surrounding environment/industry.

The absorbed target gas can be separated from the target gas capture medium using any suitable process and process vessel. In embodiments, the step of separation of the absorbed target gas from the capture medium into a gas containing vapour phase occurs in one of: a flash vessel (or flash vaporisation vessel); or a desorption vessel. In this step, that separation or desorption process can therefore comprises one of: flash vaporisation, vaporisation, boiling, stripping, or a combination thereof.

The thermal balance of the absorption fluid regeneration/desorption process can be improved through heat exchange between various higher temperature process flows and lower temperature process flows in the system. In most absorption fluid regeneration systems, the thermal energy of the heated lean capture medium is used as a source of thermal energy to heat a lower temperature process flow/line, for example the target gas rich capture medium. In embodiments, the compressed vapour is used as a first source of thermal energy to provide energy required to heat the target gas rich capture medium, and the heated lean capture medium is used as a second source of thermal energy to provide energy required to heat the target gas rich capture medium. In this embodiment, the thermal energy required for the regeneration process is provided by thermal energy within the desorption process, and more particularly the vapour compression process. The first source of thermal energy and the second source of thermal energy preferably provides substantially all of the thermal energy required to heat the target gas rich capture medium. In this respect, the thermal energy required to heat the target gas rich capture medium is preferably provided substantially by, and in some embodiments consists solely of, the first source of thermal energy in combination with the second source of thermal energy.

The use of these different types of desorption processes and/or process vessels can lead to variations of the process of the present invention tailored to that process vessel.

For examples, in embodiments where the process includes a flash vaporisation vessel, the process of regeneration of a capture medium rich in a captured target gas may comprise the steps of:

- heating a target gas rich capture medium comprising an absorbent medium, absorbed target gas and water using thermal energy, thereby facilitating the separation of the absorbed target gas from the capture medium into a gas containing vapour phase and a heated lean capture medium through flash vaporisation in a flash vessel, said gas containing vapour phase comprising the target gas and water vapour having a steam fraction of at least 0.8;
- compressing the gas containing vapour phase to form a compressed vapour; and
- using the compressed vapour as a source of thermal energy to preheat the target gas rich capture medium prior to being fed into the flash vessel.

In this embodiment, the process typically also includes the step of:

- using the heated lean capture medium to preheat the target gas rich capture medium prior to being fed into the flash vessel.

In some embodiments, the desorption vessel includes a reboiler, and the compressed vapour is used to heat the target gas rich capture medium in the reboiler. Here the compressed vapour is used to heat the capture medium in a desorber using the reboiler through which the target gas rich capture medium is heated via heat transfer within that desorber. The gas containing vapour phase could be used as the heat transfer medium/thermal working fluid within the reboiler to heat the capture medium therein (direct heat exchange) or could be used indirectly, where the gas containing vapour phase is used to heat another heat transfer medium/thermal working fluid that is then used within the reboiler to heat the capture medium therein (indirect heat exchange).

For example, in embodiments where direct heat exchange with the gas containing vapour phase is intended, the process includes a desorber vessel/column having a reboiler which is used to heat the capture medium, typically lean capture medium at the bottom of the desorber vessel/column, the process of regeneration of a capture medium rich in a captured target gas may comprise the steps of:

- heating a target gas rich capture medium comprising an absorbent medium, absorbed target gas and water using thermal energy, thereby facilitating the separation of the absorbed target gas from the capture medium into a gas containing vapour phase and a heated lean capture medium within the desorber vessel, said gas containing vapour phase comprising the target gas and water vapour having a steam fraction of at least 0.8;
- compressing the gas containing vapour phase to form a compressed vapour; and
- feeding the compressed vapour into the reboiler to be used as a source of thermal energy to heat the target gas rich capture medium.

In this embodiment, the process typically also includes the step of:

- using the heated lean capture medium to preheat the target gas rich capture medium prior to being fed into the desorber vessel.

It should be appreciated that the compressing step can be directly applied to the gas containing vapour phase formed through separation of the absorbed target gas from the capture medium into a gas containing vapour phase, such as described above, and/or could be used to compress a vapour phase thermally associated with the gas containing vapour phase, to form a compressed vapour. In most processes, the compressing step is applied directly to the gas containing vapour phase or to a vapour phase thermally associated with the gas containing vapour phase. However, it should also be appreciated that it is possible for the process to include two parallel compression steps where both the gas containing vapour phase or to a vapour phase thermally associated with the gas containing vapour phase undergo the compressing step.

For indirect heat exchange, thermal working fluid is preferably heated by the gas containing vapour to produce the vapour phase thermally associated with the gas containing vapour phase. The working fluid is preferably selected as a medium capable of undergoing a phase change, i.e. it vaporises upon heat transfer. Then it can be it can be compressed with heat recovery via condensation. In these embodiments, the process further includes the step of heating a heat transfer fluid using the gas containing vapour phase to produce said a heated heat transfer fluid. Any suitable thermal working fluid can be used. In preferred embodiments, the thermal working fluid comprises a water rich phase capable of producing a steam/water vapour phase. Here the process further includes the step of heating the water rich phase using the gas containing vapour phase to produce said steam vapour phase. In these embodiments, the gas containing vapour phase is used to heat water/water vapour, which is then used within the reboiler to heat the capture medium therein. Again, whilst water/water vapour/steam is a convenient indirect thermal working fluid, it should be appreciated that other working fluids could equally be used.

In an example of this embodiment, the process includes a desorber vessel/column having a reboiler which is used to heat the capture medium, typically lean capture medium at the bottom of the desorber vessel/column, and the compressed vapour comprises steam which has been heated from the gas containing vapour phase. In these embodiments, the process of regeneration of a capture medium rich in a captured target gas may comprise the steps of:

- heating a target gas rich capture medium comprising an absorbent medium, absorbed target gas and water using thermal energy, thereby facilitating the separation of the absorbed target gas from the capture medium into a gas containing vapour phase and a heated lean capture medium within the desorber vessel, said gas containing vapour phase comprising the target gas and water vapour having a steam fraction of at least 0.8;
- heating a water and/or water vapour phase to produce a steam phase using the gas containing vapour phase;
- compressing the steam phase to form a compressed vapour; and
- feeding the compressed vapour into the reboiler to be used as a source of thermal energy to heat the target gas rich capture medium.

In this embodiment, the process typically also includes the step of:

- using the heated lean capture medium to preheat the target gas rich capture medium prior to being fed into the desorber vessel.

The water rich phase can be heated by the gas containing vapour phase using any number of heat exchange arrangements. In embodiments, the water rich phase is heated using:

- thermal heat exchange with the gas containing vapour phase; or
- mixing or otherwise contacting the gas containing vapour phase with the water rich phase.

In the thermal heat exchange embodiment, the compressed vapour is cooled by heat exchanging against water to heat said water to produce steam. The steam generated by heat exchanging is used to provide thermal energy to heat the target gas rich capture medium.

Similarly, the compressed vapour can be used to heat the target gas rich capture medium/capture medium using any number of heat exchange arrangements. Heat transfer can be through thermal heat exchange (sensible or latent heat exchange via conduction, convective or radiation thermal heat exchange). For latent heat exchange (phase change heat exchange)—this is preferably through the heat of condensation. In embodiments, wherein the compressed vapour is used to heat the target gas rich capture medium using at least one of:

- thermal heat exchange with the target gas rich capture medium; or
- condensing heat exchange with the target gas rich capture medium, thereafter producing a condensed target gas and water phase.

Further thermal efficiencies can be provided by utilising heat from further process streams associated with the separation or desorption process vessels. In some embodiments, the process can further comprise the step of: using the condensed target gas and water phase as a further source of thermal energy for heating the target gas rich capture medium. In these embodiments, the condensed target gas and water phase composition may include a capture medium content. The process may further include the step of separating the capture medium from the target gas and water phase to form a separated capture medium. The separated capture medium is preferably mixed with the heated lean capture medium.

The steam phase does not necessarily need to be used for heat exchange with the target gas rich capture medium within a reboiler or other heat exchange vessel. In embodiments, the compressed vapour is used to heat the target gas rich capture medium by feeding the compressed vapour into the target gas rich capture medium. In these embodiments, the compressed vapour typically comprises the vapour phase thermally associated with the gas containing vapour, and in exemplary embodiments is water vapour/steam.

Here heat transfer is through direct mixing of the heated medium into the target gas rich capture medium. For example, the compressed vapour can be mixed with the capture medium in a process vessel to heat that capture medium. Where the process vessel is a desorber, the compressed vapour can be fed, mixed or injected into the capture medium within the desorber, or within a process volume fluidly connected to the desorber. Thus, in those embodiments where the vapour phase thermally associated with the gas containing vapour phase comprises a steam vapour phase, the steam vapour phase can be fed into the target gas rich capture medium, thereby directly heating the target gas rich capture medium.

One example of this mixing heating embodiment of the process includes a desorber vessel/column which is heated by a steam vapour phase. In such embodiments, the process of regeneration of a capture medium rich in a captured target gas may comprise the steps of:

- heating a target gas rich capture medium comprising an absorbent medium, absorbed target gas and water using thermal energy, thereby facilitating the separation of the absorbed target gas from the capture medium into a gas containing vapour phase and a heated lean capture medium within the desorber vessel, said gas containing vapour phase comprising the target gas and water vapour having a steam fraction of at least 0.8;
- heating a water and/or water vapour phase to produce a steam phase using the gas containing vapour phase;
- compressing the steam phase to form a compressed vapour; and
- feeding the compressed vapour into the desorber vessel to heat the target gas rich capture medium.

In this embodiment, the process typically also includes the step of:

- using the heated lean capture medium to preheat the target gas rich capture medium prior to being fed into the desorber vessel.

The heated lean capture medium is used to heat the target gas rich capture medium using any number of heat exchange arrangements, including direct heat exchange forms and indirect heat exchange forms. In embodiments, the heated lean capture medium is used to heat the target gas rich capture medium using at least one of the following:

- heat exchange with the target gas rich capture medium; or
- heat exchange with a thermal transfer medium that transfers heat to the target gas rich capture medium.

The compressing step can be conducted using any suitable compression arrangements and methods. The compressing step can therefore comprise a single compression stage or a multi-stage compression stage. Where the compressing step comprises a multi-stage compression stage, heat is preferably recovered between each compression stage using at least one intercooler located therebetween. Each compression stage preferably has a compression ratio of between 1.1 and 10. It should be appreciated that the compression ratio is dependent on the compressor used in the process (and thus commercially available). In the range of steam fractions 0.8-0.999 in the exit stream a higher compression ratio would generate more sensible heat that is most beneficial for lower zone range, whereas a low compression ratio would be most effective at the higher zone range. These considerations might be overruled by the requirement to deliver the target gas at elevated pressure in which case a high compression ratio is desirable regardless of the steam fraction. This will be the case if the target gas, for example $CO_2$ is sent to be transported as supercritical liquid to a geological storage reservoir. In some embodiments, as some $CO_2$ uses require compressed $CO_2$ for compression, it can be advantageous to already start the compression at the $CO_2$-desorber exit.

The absorption medium of the capture medium can comprise any suitable absorption fluid. In embodiments, the absorbent medium comprises at least one of:

- a salt solution, i.e. solutions without vapour pressure, preferably an alkaline salt solution or an amino-acid salt solution; or
- an amine solution that has an amine vapour pressure that is less than 10% of the $CO_2$ partial pressure in the gas rich capture medium.

It should be appreciated that the presence of significant amine vapours may result in co-absorption of $CO_2$ and amines into the condensed water, which results in part removal of the $CO_2$ due to the reaction with amine. However, the inventors have found that if the amine vapour pressure is small compared to the $CO_2$ pressure, for example 10%, this loss is acceptable.

In embodiments, the absorbent medium comprises alkaline salts and salts of amino-acids. Exemplary examples include: Potassium, lithium and sodium salts of carbonate, phosphate, glycine, taurine, alanine, sarcosine, proline, lysine, methyltaurine, methionine, aminohexanoic acid, phenylalanine, glutamic acid, arginine aspartic acid, leucine, serine, threonine, glucosamine, dimethyl-glycine, methyl-amino-propionic acid, amino-butyric acid, pipecolic acid, preferably having concentrations between 0.005 and 5.0 M, more preferably between 0.5 and 2.5 M.

Finally, the target gas can comprise any desired gas that is capable of being absorbed in an absorption fluid, preferably an absorption liquid. The target gas typically comprises an acid gas, such as at least one of $CO_2$, $H_2S$, HCl, HF, $SO_2$, $SO_3$ or $NO_x$. In many embodiments, the target gas comprises carbon dioxide ($CO_2$).

A second aspect of the present invention provides a process for the removal and recovery of a target gas from a gas stream which comprises the steps of:

- absorbing a target gas from a source gas stream into a capture medium by feeding the source gas stream through a lean capture medium so as to cause a target gas component of the gas stream to absorb into the capture medium to produce a target gas rich capture medium; and
- processing the target gas rich capture medium in accordance with the process of first aspect of the present invention.

A third aspect of the present invention provides an apparatus for the regeneration of a capture medium rich in a captured target gas and the recovery of captured gas therefrom comprising:

- a process vessel including a process volume;
- a supply conduit to feed gas rich capture medium into the process volume;

at least one heating arrangement configured to heat the target gas rich capture medium to a temperature that facilitates the absorbed target gas to separate from the capture medium into a gas containing vapour phase comprising the target gas and water vapour having a steam fraction of at least 0.8, and to produce a heated lean capture medium;

a vapour recompression system fluidly connected to the process volume to receive and compress the gas containing vapour phase from at least one of: the process volume; or a vapour phase thermally associated with the gas containing vapour phase, and form a compressed vapour; and a compressed vapour supply conduit to supply compressed vapour to the at least one heating arrangement as a source of thermal energy to heat the target gas rich capture medium.

As with the first aspect, the apparatus utilises a high steam fraction in the exit stream of the process vessel which is high enough to enable significant recovery of latent heat in additional to recovery of the sensible heat. The inventors have found that this requires a steam fraction of at least 0.8, preferably above 0.85, and more preferably above 0.9. In embodiments, the gas containing vapour phase comprises the target gas and water vapour having a steam fraction of between 0.8 to 0.999. In embodiments, the gas containing vapour phase comprises the target gas and water vapour having a steam fraction of between 0.8 to 0.999, and more preferably a steam fraction of between 0.8 to 0.99, and yet more preferably between 0.9 and 0.99. In some embodiments, the target gas and water vapour have a steam fraction of between 0.9 to 0.999, and preferably between 0.95 to 0.999. In some embodiments, the target gas and water vapour have a steam fraction of between 0.8 to 0.995, preferably between 0.9 to 0.995. In embodiments, the gas containing vapour phase comprises the target gas and water vapour having a steam fraction of at least 0.9.

Again, the steam content of the gas containing vapour phase can be expressed as a steam/target gas ratio. Here, the steam/target gas ratio of the gas containing vapour phase comprising the target gas and water vapour is preferably at least 4, more preferably at least 8, and yet more preferably at least 10. In embodiments, the steam/target gas ratio is preferably from 4 to 1000.

In embodiments, the apparatus further comprises: a heated lean capture medium supply conduit to supply heated lean capture medium to the at least one heating arrangement as a second source of thermal energy to heat the target gas rich capture medium. In these embodiments, the apparatus can be configured so that the first source of thermal energy and the second source of thermal energy provides the thermal energy required to heat the target gas rich capture medium to a temperature that facilitates the absorbed target gas to separate from the capture medium into a gas containing vapour phase comprising the target gas and water vapour. In embodiments, the supply of thermal energy to the heating arrangement is provided substantially by, preferably consists solely of, the heat recovered from the vapour recompression system in combination with the heat recovered from the heated lean capture medium.

The process vessel comprises any suitable process vessel in which a vapour phase can be separated from a liquid phase. In embodiments, the process vessel comprises one of: flash vaporisation vessel, vaporisation vessel, boiling vessel, desorption vessel or a combination thereof.

The heating arrangement comprises any suitable heat exchange vessel, system or process that enables heat to be transferred from the feed gas rich capture medium. Where the process volume includes the capture medium, the at least one heating arrangement preferably includes a heating arrangement configured to heat the feed gas rich capture medium in that process volume. That heating arrangement may comprise at least one heat exchanger. That heat exchanger can be at least one thermal (sensible heat) heat exchanger, condensing heat exchanger, or at least one mixing heat exchanger. Here heat transfer can be through thermal heat exchange (sensible or latent heat exchange via conduction, convective or radiation thermal heat exchange). For latent heat exchange (phase change heat exchange)—this is preferably through the heat of condensation. Alternatively, there can be thermal exchange through mixing.

In particular embodiments, the at least one heating arrangement includes a reboiler, preferably a condensing reboiler, configured to heat the target gas rich capture medium in the reboiler. The reboiler is typically fluidly connected to a desorption vessel or column and is used to heat capture medium within that desorption vessel or column.

The target gas rich capture medium is not necessarily heated within the process volume. In embodiments, the gas rich capture medium can be preheated before entering the process volume of the process vessel. In these embodiments, the at least one heating arrangement includes at least one preheating arrangement configured to heat the feed gas rich capture medium prior to the feed gas rich capture medium being fed into the process volume. In some embodiments, at least the heated lean capture medium is used to heat the target gas rich capture medium in the at least one preheating arrangement.

In some embodiments, the compressed vapour is used to heat the target gas rich capture medium in the at least one preheating arrangement. For example, in those embodiments the process vessel comprises a flash vaporisation vessel, and the compressed vapour is used to heat the target gas rich capture medium in the at least one preheating arrangement. In these embodiments, the heated lean capture medium is typically also used to heat the target gas rich capture medium in the at least one preheating arrangement.

As with the first aspect, it should be appreciated that the vapour recompression system can be directly applied to the gas containing vapour phase formed in the at least one heating arrangement, such as described above, and/or could be used to compress a vapour phase thermally associated with the gas containing vapour phase, to form a compressed vapour. In most processes, the vapour recompression system is applied directly to the gas containing vapour phase or to a vapour phase thermally associated with the gas containing vapour phase. However, it should also be appreciated that it is possible for the process to include two parallel the vapour recompression systems where both the gas containing vapour phase or to a vapour phase thermally associated with the gas containing vapour phase undergo the compression.

As explained for the first aspect of the present invention, a secondary thermal working fluid can be used to heat the target gas rich capture medium. In these embodiments, that secondary thermal working fluid is heated by the gas containing vapour phase. In an example embodiment, the vapour phase thermally associated with the gas containing vapour phase comprises a steam vapour phase. Here, the apparatus can further include an indirect heat exchanger arrangement configured to heat a water rich phase using the gas containing vapour phase to produce said steam vapour phase. The indirect heat exchanger can comprise any suitable heat exchange configuration, such as at least one heat exchanger. That heat exchanger can be at least one thermal (sensible heat) heat exchanger, at least one condensing heat exchanger, or at least one mixing heat exchanger. Here heat transfer can be through thermal heat exchange (sensible or latent heat exchange vis conduction, convective or radiation thermal heat exchange). For latent heat exchange (phase change heat exchange)—this is preferably through the heat of condensation. Alternatively, there can be thermal exchange through mixing.

In embodiments, the at least one heating arrangement includes:

a preheating arrangement comprising a condensing heat exchanger configured to transfer energy from the compressed vapour to heat the feed gas rich capture medium prior to the feed gas rich capture medium being fed into the process volume and a preheating arrangement.

The at least one heating arrangement can include two (or more) preheating arrangements. In embodiments, the at least one heating arrangement includes:

a first preheating arrangement comprising a condensing heat exchanger configured to transfer energy from the compressed vapour to heat the feed gas rich capture medium prior to the feed gas rich capture medium being fed into the process volume and a preheating arrangement, and a second preheating arrangement configured to transfer thermal energy from the target gas and water phase after passing through the condensing heat exchanger to heat the feed gas rich capture medium prior to the feed gas rich capture medium being fed into the process volume.

Where the condensed target gas and water phase includes a capture medium content, the apparatus may further include a separator configured to separate the capture medium from the target gas and water phase to form a separated capture medium. In some embodiments, the separated capture medium is mixed with the heated lean capture medium.

Again, the steam vapour phase does not necessarily need to be used for heat exchange with the target gas rich capture medium within a reboiler or other heat exchange vessel. In embodiments, the compressed vapour is used to heat the target gas rich capture medium by feeding the compressed vapour into the target gas rich capture medium. In such embodiments, the process vessel comprises a desorption vessel, and the at least one heating arrangement comprises at least one mixing heat exchanger configured to heating the target gas rich capture medium by feeding the compressed vapour into the target gas rich capture medium in the process volume of the desorption vessel or a volume fluidly connected to said process volume. Here heat transfer is through direct mixing of the heated medium into the target gas rich capture medium. In embodiments, the vapour phase thermally associated with the gas containing vapour phase comprises a steam vapour phase, and the steam vapour phase is fed into the target gas rich capture medium in the process volume, or a volume fluidly connected to the process volume of the desorber, thereby directly heating the target gas rich capture medium.

The process vessel is preferably operated at atmospheric or above atmospheric pressure. In embodiments, the process vessel has an operating pressure of at least 1 bara, preferably at least 1.5 bara.

The vapour recompression apparatus can have any suitable configuration. In embodiments, the vapour recompression apparatus comprises a plurality of compressors in series. In embodiments, the vapour recompression apparatus comprises a single stage compressor or a multi-stage stage compressor. Each compressor preferably has a compression ratio of between 1.1 and 10. In embodiments where the vapour recompression apparatus comprises a multi-stage stage compressor, the apparatus further comprises at least one intercooler located between each compressor to recover heat therefrom. The vapour recompression system and compressors thereof can be driven by any suitable power or energy source. Preferably, the vapour recompression system is driven from a source of electrical power. That electrical power can have any generation source. However, renewable (green) energy generation sources (for example wind, solar, wave power etc) can provide particular advantageous efficiencies for the process of the present invention. Moreover, renewable energy does not produce significant (if any) $CO_2$-emissions. As renewable energy is increasingly and very conveniently produced as electricity there is also a preference to use electricity only to drive the thermal regeneration.

In embodiments, the apparatus further comprises a condenser to condense and recover capture medium vapour from the compressed vapour phase. In some embodiments, the apparatus further comprises a condenser to condense and recover water vapour from the vapour phase thermally associated with the gas containing vapour phase. In some embodiments, the apparatus includes a separator configured to target gas from water from the gas containing vapour phase after passing through the at least one heating arrangement.

The apparatus of this third aspect of the present invention can be fluidly connected to an absorption apparatus configured to absorb a target gas from a source gas stream into a capture medium, producing a target gas rich capture medium which is fed to the regeneration apparatus for regeneration of capture medium and recovery of absorbed target gas therefrom. This provides an overall target gas capture and recovery apparatus and process. In other embodiments, the present invention provides an apparatus for removal of a target gas from a source gas stream comprises an absorption apparatus fluidly upstream of a regeneration apparatus in accordance with any one of the preceding claims. The source gas stream preferably includes a target gas selected from at least one of $CO_2$, $H_2S$, HCl, HF, $SO_2$, $SO_3$ or $NO_x$, preferably $CO_2$. For example, the source gas stream could be at least one of: flue gas from a combustion apparatus for the burning of carbonaceous fuels, such as flue gas from a thermal power plant.

A fourth aspect of the present invention provides a process according to the first aspect of the present invention, comprising feeding the gas rich capture medium through a regeneration apparatus in accordance with the third aspect of the present invention having a heating arrangement to heat the gas rich capture medium and thereby cause captured gas to dissociate into a gas rich vapour phase; wherein the compressed vapour is used to supply thermal energy to the heating arrangement.

The process and apparatus of the present invention can be used for Direct Capture from Air and $CO_2$ capture from power plants. At the low $CO_2$ liquid loadings resulting from a Direct Air Capture process, the desorption conditions would be such that high steam fractions are encountered at typical regeneration temperature between 10° and 120° C.

High steam fractions are encountered when liquid absorbents are regenerated deeply and $CO_2$-loadings are limited in the absorption process, e.g. by operation at high liquid flow rates. Use of the present invention may enable smaller absorber towers to be used in $CO_2$-capture from coal or gas fired power plants as a result of the higher driving forces in the absorber. This will lead to smaller absorber and CAPEX advantages.

A further aspect of the present invention therefore provides a thermal power plant comprising a combustion means to burn carbonaceous fuel and generate steam provided a thermal power plant comprising a combustion means to burn carbonaceous fuel and generate steam, and a regeneration apparatus in accordance with the third aspect of the present invention. In some embodiments, the thermal power plant comprises a gas removal apparatus in accordance with the third aspect of the present invention and a flue gas outlet fluidly connected to supply flue gas directly from the combustion apparatus as a source gas stream to the removal apparatus.

The preferred application of the process and apparatus of the present invention is in $CO_2$-capture from ambient air (Direct Air Capture-DAC), where the liquid regeneration will result in the production of high vapour content in the $CO_2$-product. However, it should be appreciated that the present invention can be used for:

Liquid absorbent-based $CO_2$-capture processes in particular direct air capture processes where the low $CO_2$ loading will result in high steam/$CO_2$ ratios at the desorber outlet.

Other $CO_2$-capture applications than direct air capture where the process can be used to achieve deep regeneration of the absorption liquids which can enable higher cyclic $CO_2$ loading or smaller $CO_2$-absorbers as the driving force and reaction kinetics will be more favourable.

Solid sorbent processes that use steam for absorbent regeneration.

An add-on to a conventional $CO_2$-capture process if deeper regeneration and leaner absorption liquids are needed. This will have a benefit in terms of reducing the equipment size for the $CO_2$-absorption process.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 2:
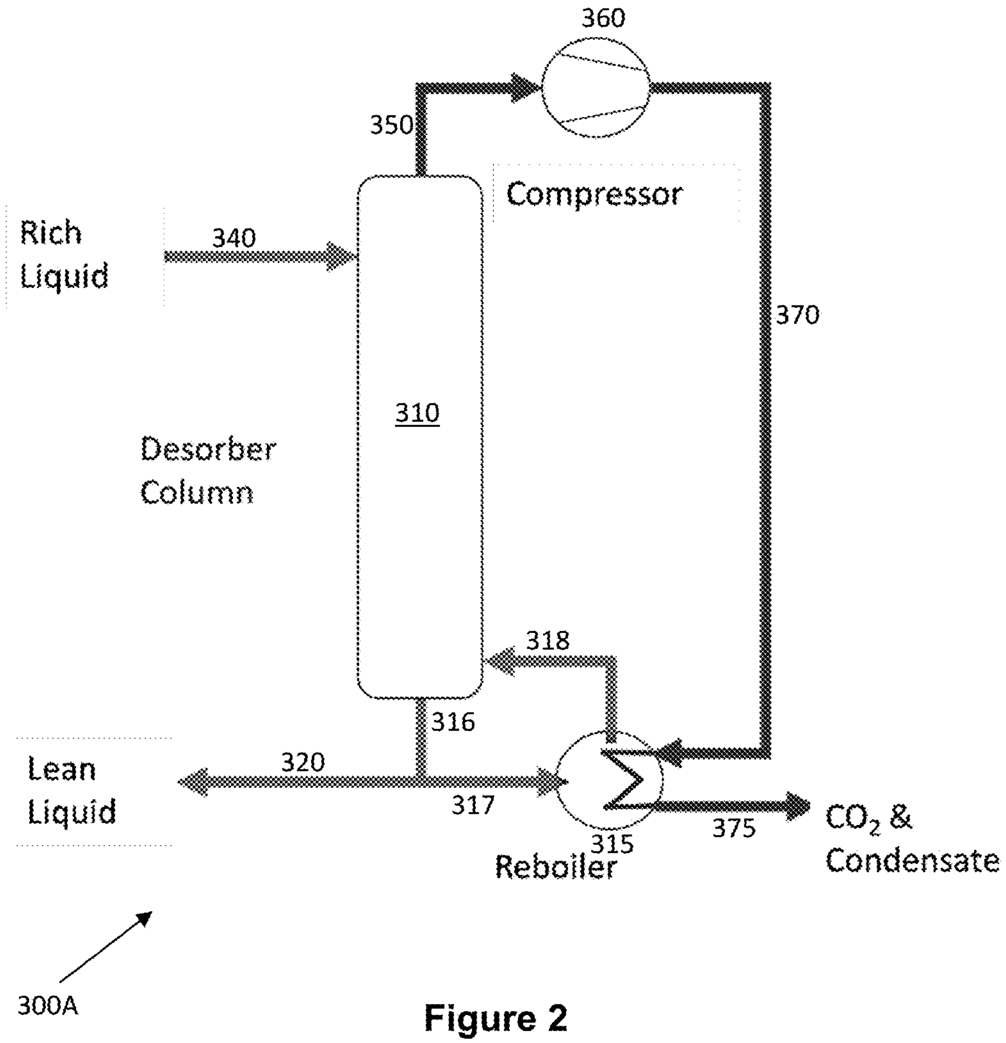
FIG. 2 illustrates one process example of the present invention illustrating absorbent regeneration using vapour compression of desorber off-gases ($CO_2$ and steam) with subsequent heat transfer in the reboiler.
Figure 3:
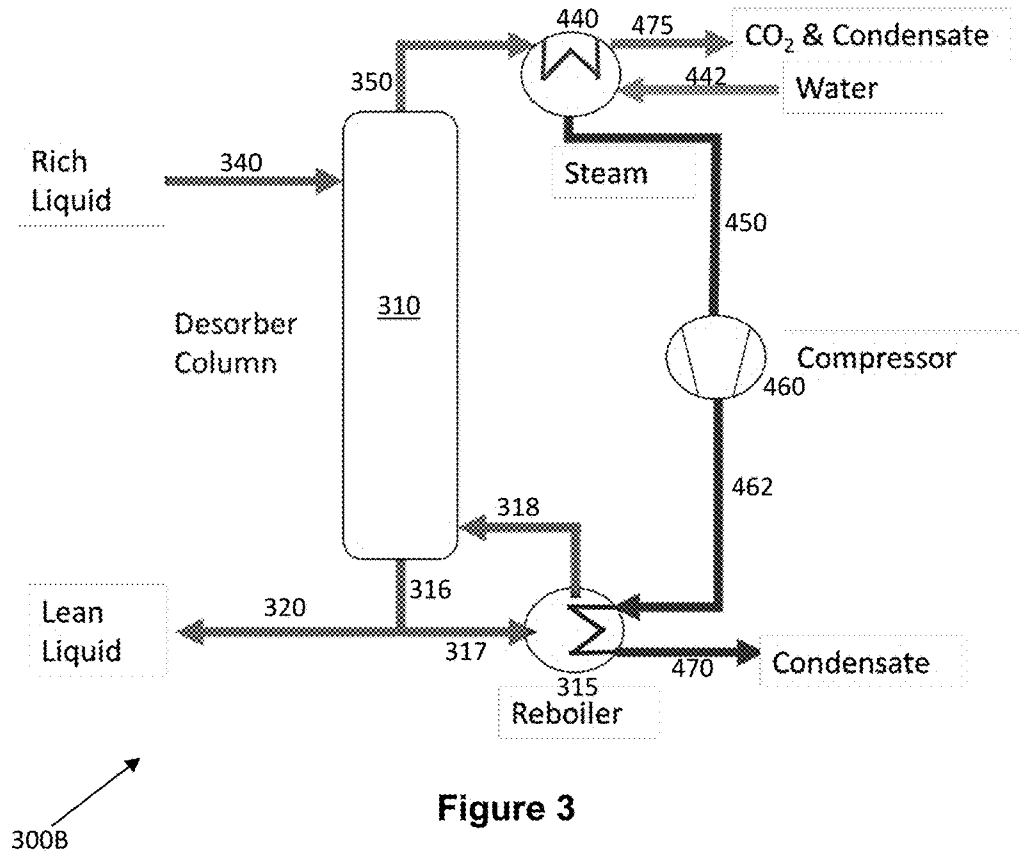
FIG. 3 illustrates one process example of the present invention illustrating absorbent regeneration using vapour compression steam raised by heat exchange with desorber off-gases ($CO_2$ and water vapour) with subsequent heat transfer to the reboiler.
Figure 4:
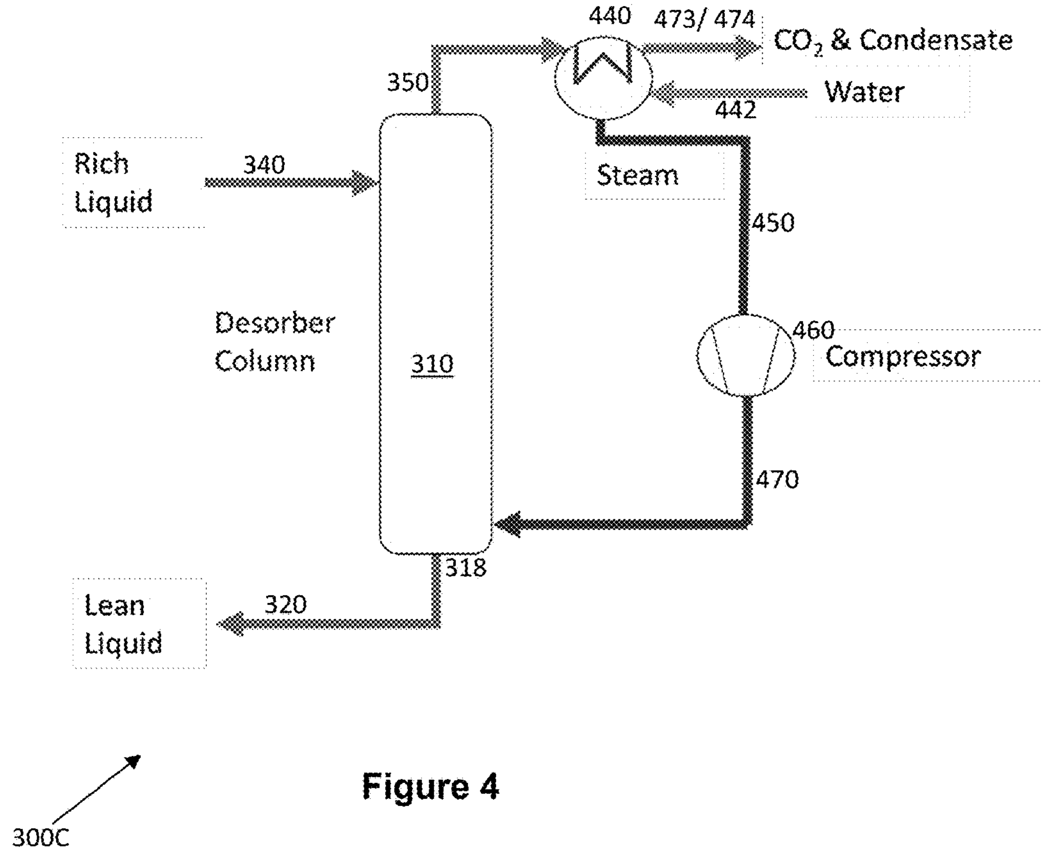
FIG. 4 illustrates one process example of the present invention illustrating absorbent regeneration using vapour compression steam raised by heat exchange with desorber off-gases ($CO_2$ and steam) with subsequent injection of steam into desorber.

The present invention provides a process, apparatus and system for regeneration of capture mediums, such as liquid absorbents, used to capture a target as such as $CO_2$, in which the thermal energy required for the regeneration process is provided by thermal energy within the desorption process, and more particularly the vapour compression process. The present invention typically forms part of a target gas absorption-desorption process which includes an absorber 100 such as illustrated in FIG. 1(*a*), coupled with a vapour separator vessel such as flash vessel 200 (FIG. 1(*b*)) or a desorber/regeneration vessel 200, 200A, 200B (FIGS. 2, 3 and 4).

The following description relates to the capture of carbon dioxide. However, it should be appreciated that other target gases could equally be used such as $H_2S$, HCl, HF, $SO_2$, $SO_3$ or $NO_x$ which can absorbed by a suitably matched absorption fluid/liquid.

Figure 1:
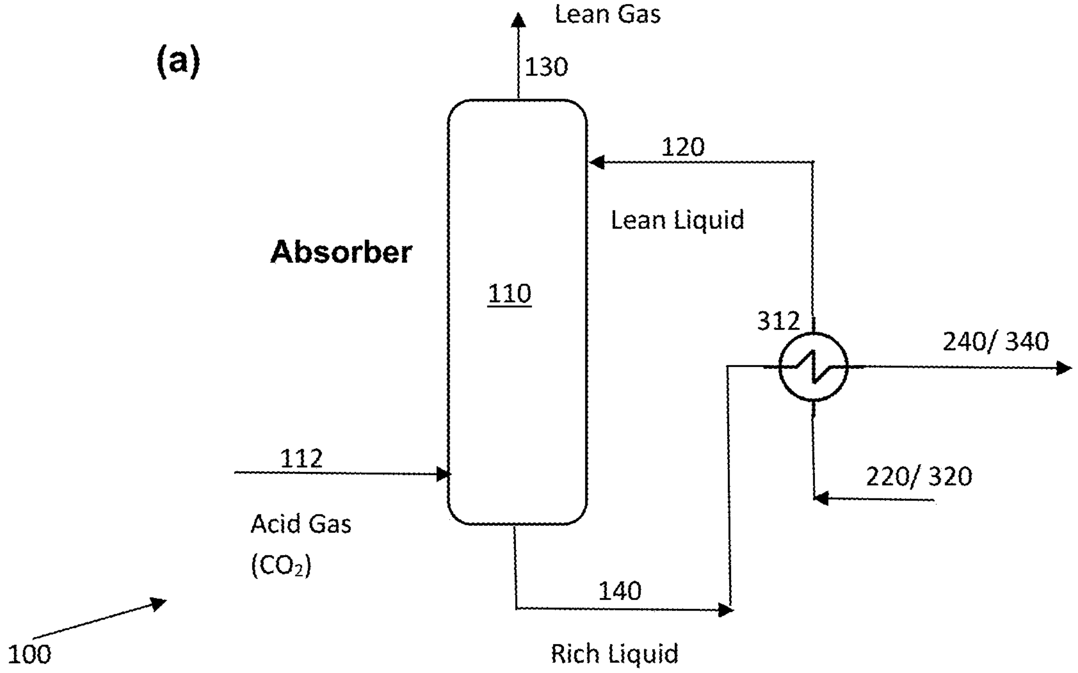
FIG. 1 illustrates (a) an upstream target gas absorption process that can supply a target gas rich capture medium to a process of the present invention; and (b) one process embodiment of the present invention illustrating an absorbent regeneration using vapour compression of flashed gases ($CO_2$ and steam) with subsequent heat transfer to rich liquid.
Figure 1:
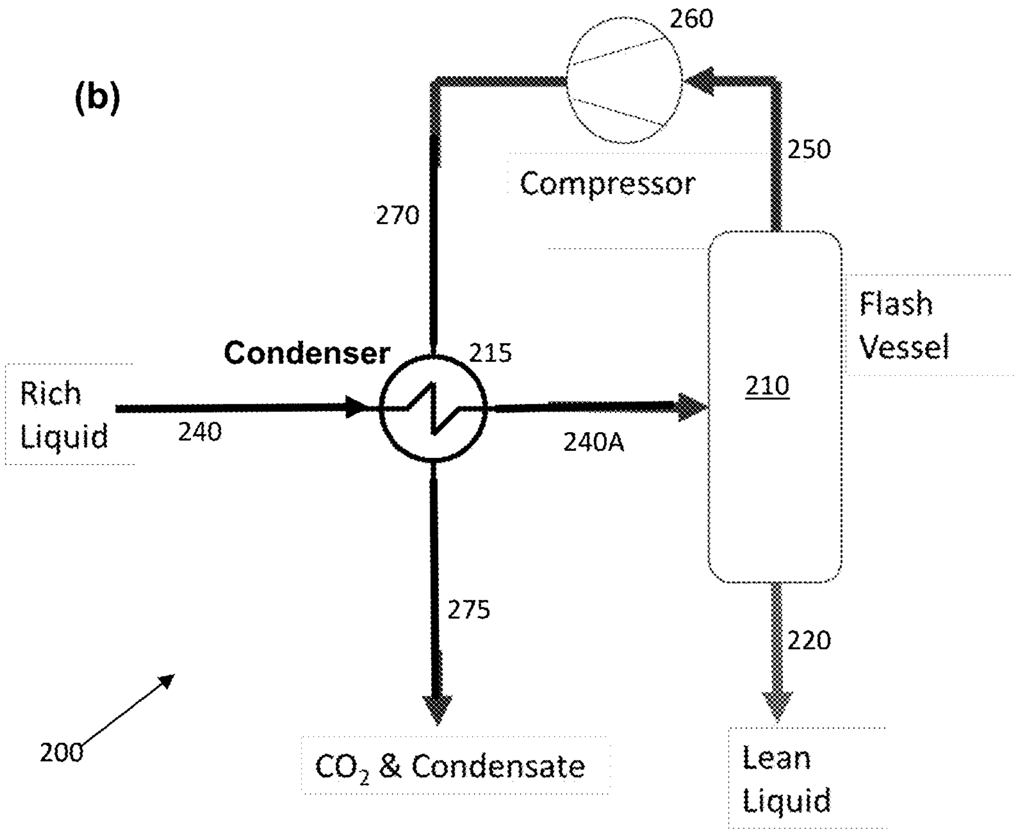

FIG. 1(*a*) illustrates a conventional absorption tower system 100 in which where a gas stream including the target gas ($CO_2$), for example an exhaust gas from combustion of carbonaceous fuel, enters the lower part of absorption vessel/tower 110 through gas inlet line 112. Lean absorbent—i.e. absorbent that is stripped for $CO_2$—is introduced into the upper part of the absorption tower 100 through a lean absorbent line 120. The gas flows from the bottom to the top of the absorption tower 110 countercurrent to a lean absorbent, which flows from the top to the bottom of the absorption tower 110. Lean gas, i.e. exhaust gas where a substantial part of the $CO_2$ is removed, is removed through a gas exit line 130 at the top of the absorption tower 110, whereas rich absorbent, i.e. absorbent having absorbed $CO_2$, exits from the absorption tower 110 through a rich absorbent line 140.

The regeneration of aqueous absorption liquids used in absorption systems such as shown in FIG. 1(*a*) applied for the capture of acid gases such as $CO_2$ from gas streams is usually carried out at elevated temperature (90 to 150° C.) when $CO_2$ is released or desorbed from the aqueous solution as a result of the thermal reversibility of the capture process. This is achieved through the supply of heat at the required temperature level from a suitable source, such as the steam cycle of a power plant, a separate boiler, a solar thermal process, a geothermal process, or any other heat source. The supply of heat commonly results in an additional emission of $CO_2$ that needs to be accounted for in the overall emissions reductions. In some circumstances heat sources are not available and the heat needs to be generated in a separate facility that results in significant, additional $CO_2$-emissions.

One type of regeneration system is shown in FIGS. 2 and 3, comprising a desorber vessel/column 310. The rich absorbent 140 from the absorber tower 100 is heated against lean absorbent that is returned to the absorption tower in a heat exchanger 312 (FIG. 1(*a*)) to a temperature typically in the range between 9° and 110° C., before the rich absorbent is introduced into a desorber column 310 via inlet conduit 340. In the desorber column 310 the rich absorbent flows downwards, countercurrent to steam generated by heating some of the absorbent in a desorber reboiler 315. Lean absorbent leaves the desorber column 310 through a lean absorbent outlet 316. A part of the lean absorbent in the outlet 316 is introduced into the desorber reboiler 315 through line 317 where it is heated to a temperature typically in the range between 12° and 130° C., to produce hot absorbent and steam which is re-introduced into the desorber column 310 through line 318. The heating of the desorber column 310 from the bottom gives a temperature gradient at steady state from the bottom to the top of the column 310, where the temperature at the top is from 10 to 50° C. lower than at the bottom, depending on the actual design of the column 310. The pressure in the desorber column 310 is normally atmospheric pressure or higher to obtain an effective desorption of the absorbent or stripping of $CO_2$. The pressure in the desorber column 310 is often 1.5 bara or higher. In a practical situation, the pressure is often from about 1.5 to about 2.0 bara but may even exceed this pressure.

The lean absorbent in line 316 that is not introduced into the desorber reboiler 315, is recycled back to the absorption column 110 (FIG. 1(*a*)) through the line 320 and cooled in the heat exchanger 312 against rich absorbent in the line 140. In the heat exchanger 315 the relatively cold rich absorbent is heated against the relatively hot lean absorbent leaving the absorption tower 110 at a temperature of about 120° C. Depending on the actual dimensioning and construction of the plant, the temperature of the absorbent leaving the heat exchanger 312 for the absorption tower 110 may be from about 90 to about 110° C.

$CO_2$ released from the absorbent, water vapour and minor amounts of absorbent form a gas containing vapour phase, which is withdrawn from the desorber column 310 through a gas withdrawal line 350. It should be appreciated that the water vapour withdrawn through line 350, and the condensed water removed in the desorption column 310, may comprise minor amounts of absorbent. The water and water vapour from this line 350 therefore typically include water and water vapour including minor amounts of absorbent, where appropriate. The processing of that gas containing vapour phase from gas withdrawal line 350 depends on the particular embodiment of the present invention described below.

In conventional regeneration systems, the lean absorbent in the reboiler 315 is typically heated by means of electricity, or a heating medium, such as steam. Generally, the provision of thermal energy via electricity, for example using resistive or inductive heating, is considered wasteful and electrically driven heat pumps are preferred because of their higher efficiency. In such a heat pump application, gases are compressed, resulting in a temperature increase with heat recovery via condensation of the liquids from the compressed gases.

The present invention proposes the use of vapour compression systems which more effectively recover thermal energy from that system needed for regeneration of the aqueous absorption liquids and $CO_2$-desorption. Two systems are proposed:

(1) a direct vapour compression system (FIGS. 1(*b*) and 2); and (2) an indirect vapour compression system (FIGS. 3 and 4).

The starting point for both the direct and indirect vapour compression systems is to analyse the thermal energy requirement per unit mass of $CO_2$ released, the so-called specific reboiler duty (MJ/kg $CO_2$), in more detail. This thermal energy requirement has the following three contributions:

1) The energy required to break the bond between $CO_2$ and the active components in the absorption liquid as determined by its chemical formulation.
2) The heat required for bringing the solvent up to the regeneration temperature, which is a function of the $CO_2$ loading of the liquid absorbent and temperature difference across the $CO_2$-desorber.
3) The evaporation enthalpy for the steam that leaves the $CO_2$-desorber together with the $CO_2$, which is determined by the temperature of the steam-saturated $CO_2$-product leaving the $CO_2$-desorber at the top.

The minimisation of the thermal energy requirement is an important objective in $CO_2$-capture technology development work involving extensive evaluation of different absorption liquids, considering their intrinsic characteristics, such as vapour-liquid equilibria and reaction enthalpies, and process conditions such as regeneration temperature and pressure in the $CO_2$-desorber. In particular, as the amount of steam leaving the $CO_2$-desorber represents a loss of energy, process and design optimisation focuses on the minimisation of the steam/$CO_2$ ratio in the stream exiting the $CO_2$-desorber. The Applicant's U.S. Pat. No. 10,040,023, "Process and apparatus for heat integrated liquid absorbent regeneration through gas desorption" is an example of how the thermal energy requirement can be minimised by new process and equipment designs.

As discussed in the background, a number of prior art processes have been developed that use compression of the $CO_2$-stream from the desorber with subsequent heat recovery to lower the thermal energy requirement for $CO_2$ desorption. However, none of these processes include a $CO_2$-desorption process in which all the thermal energy required is provided by energy transfer from the regeneration stage/desorption stage within that process. This is because energy efficient liquid regeneration process concepts are based on the minimisation of the water content of the wet $CO_2$-product leaving the $CO_2$-desorber. Such processes fail to recognise the full benefits of the vapour compression process.

In the present invention, the steam content in the $CO_2$-product in the vapour compression process is high (within the steam fractions discussed below) so to achieve high recovery of energy via the condensation of water to supply the overall heat requirement of the capture process. This is in contrast to the common approach of minimisation of steam content in the exit stream from the $CO_2$-desorber in prior art regeneration processes.

As noted above, latent heat contained in the exit gas stream from the $CO_2$-desorber can be recovered and reused in the regeneration of the absorption liquid and $CO_2$-desorption through two different pathways means:

1. Directly using the condensate from the steam/$CO_2$ stream (for example the systems illustrated in FIGS. 1(*b*) and 2); or
2. Indirectly using steam generation via heat recovery of the condensate (for example the systems illustrated in FIGS. 3 and 4).

Direct Latent Heat Recovery

In addition to heat exchange between the lean liquid stream and rich liquid stream (for example as shown using heat exchanger 312 in FIG. 1(*a*)), the direct system entails compression of the exit gas stream from the $CO_2$-desorber vessel, which consists of a mixture of steam and $CO_2$, with subsequent heat recovery to such an extent that it suffices to provide the total additional thermal energy requirement for the $CO_2$-desorption process. As such the $CO_2$-capture process can then be operated using electrical energy only, that can be sourced from renewable energy sources such as solar cells or wind turbines. Coarsely speaking two pathways for heat recovery have been identified by the inventors:

Concept 1

As illustrated in FIG. 1(*b*), the system 200 has incoming rich liquid absorbent 240 fed into a flash vessel 210 to generate $CO_2$ and steam (line 250) and separate lean liquid (line 220) through flash vaporisation. Flashing is followed by compression of the $CO_2$/steam mixture in compressor 260 and recovery of heat from the compressed vapour stream in condenser 215 via condensation of water. Heat is transferred in condenser 215 to the incoming rich liquid absorbent 240, to produce a further heated rich liquid absorbent 240A. The pressure in the flash vessel 210 is normally atmospheric pressure or higher to obtain an effective desorption of the absorbent, or stripping of $CO_2$, and is more typically 1.5 bar or higher. Practically, the pressure is often from about 1.5 to about 2.0 bar but may even exceed this pressure.

This first concept is akin to a Mechanical Vapour Recompression (MVR) process in which low pressurisation and high rates of evaporation are used. MVR is used in industrial applications such as the production of freshwater from seawater and in liquid and solids dehydration.

Concept 2

This concept (system 300A) includes the previously described desorber column 310 and desorber reboiler 315 and processes the gas containing vapour phase withdrawn from the desorber column 310 through a gas withdrawal line 350. As illustrated in FIG. 2, the $CO_2$/steam mixture from gas withdrawal line 350 of desorber column 310 is compressed in compressor 360 and then the resulting compressed vapour (in line 370) is fed into the reboiler 315 in which heat is recovered from the compressed vapour stream via condensation of water and transferred to/heats up the recirculating lean absorption liquid at the bottom of the desorber column 310 thus generating steam required for the desorption of $CO_2$ in the desorber column 310. This is akin to the steam stripping process in standard desorber columns where steam is generated at the bottom of the desorber column 310.

Compression of the steam/$CO_2$ stream is advantageous for most subsequent storage and utilisation options which often require $CO_2$ at elevated pressure, for example in excess of 100 bar, if $CO_2$ is used for geological storage. Such high pressures are not needed for other cases where $CO_2$ is used as reactant to produce carbonates or fuels or where $CO_2$ is used to promote plant growth.

Indirect Latent Heat Recovery

The indirect process is based on the transfer the latent heat in the exit gas stream from the $CO_2$-desorber via condensation to an incoming water stream that will be converted into steam. The latent heat from the high steam fraction in the desorber exit can thus be converted into pure steam that is subsequently compressed with heat recovery via condensation by the following pathways:

Concept 3

This concept (system 300B) also includes the previously described desorber column 310 and desorber reboiler 315 and processes the gas containing vapour phase withdrawn from the desorber column 310 through a gas withdrawal line 350. As illustrated in FIG. 3, the $CO_2$/steam mixture from gas withdrawal line 350 of desorber column 310 passes into heat exchanger 440 which transfers the latent heat of the $CO_2$/steam mixture from gas withdrawal line 350 to water in line 442 to produce a water vapour/steam phase which exits the heat exchanger 440 in line 450. The $CO_2$/steam mixture exits the heat exchanger in line 473 as a wet $CO_2$ phase and water/condensate. The steam phase in line 450 is then compressed in compressor 460 and fed into the reboiler 315 via line 462. Heat transfer to the absorption liquid in the desorber column 310 is via condensation of steam and latent heat transfer in the reboiler 315 and/or via a preheating arrangement (not illustrated) to the incoming rich solution in line 340. Condensate exits the system in line 470 which can be recycled back to heat exchanger 440 via line 442 to generate further steam. This will facilitate a complete closed vapour compression-based steam cycle for heat recovery from the desorber column 310 and heat supply to the desorber column 310. A closed system is can also be based on other working fluids—thermal transfer fluids—other than water.

Concept 4

As illustrated in FIG. 3, the system 300C has the $CO_2$/steam mixture from gas withdrawal line 350 of desorber column 310 passing into heat exchanger 440 which transfers the latent heat of the $CO_2$/steam mixture from gas withdrawal line 350 to water in line 442 to produce a water vapour/steam phase which exits the heat exchanger 440 in line 450. The $CO_2$/steam mixture exits the heat exchanger in line 473 as a wet $CO_2$ phase and a water/condensate in line 474 (see for example FIG. 6A). That steam phase in line 450 is then compressed and fed directly into the desorber column 310. Injection of the steam into the desorber column 310 is used to replace the reboiler as heat supply and for desorption of $CO_2$. This embodiment does not require any additional heat exchange equipment. The input water stream can be made up by the condensate from the desorber column 310 with the resulting steam acting as a stripping gas in the desorber column 310.

The process operation in both direct and indirect process will be most beneficial at high steam content of the $CO_2$ product in the desorber as this will lead to the highest recovery of latent heat from the stream fraction. In this regard, each of the processes illustrated in FIGS. 1(*b*) to 4 operate with the following operational parameters:

Steam/$CO_2$ ratio in exit stream of $CO_2$ desorber needs to be high to enable significant recovery of latent heat in additional to recovery of the sensible heat. This will require a steam fraction of at least 0.8, preferably above 0.9.

A variety of liquid absorbents can be used. The preferred absorption liquids will be:

salt solutions, i.e. solutions without vapour pressure, such as alkaline salt solutions or amino-acid salt solutions. Exemplary examples include: Potassium, lithium and sodium salts of carbonate, phosphate, glycine, taurine, alanine, sarcosine, proline, lysine, methyltaurine, methionine, aminohexanoic acid, phenylalanine, glutamic acid, arginine aspartic acid, leucine, serine, threonine, glucosamine, dimethyl-glycine, methyl-amino-propionic acid, amino-butyric acid, pipecolic acid preferably having concentrations between 0.005 and 5.0 M, more preferably between 0.5 and 2.5 M.

It should be appreciated that a variety of other absorbents could be used, for example as taught in Australian Patent No. AU552657B2 entitled amino-acids for gas absorption, U.S. Pat. No. 2,176,441 entitled Removal of gaseous weak acid from gases containing the same; and Canadian Patent No. CA 619,193 entitled Process for separating carbon dioxide from gas mixtures, the contents of which should be understood to be incorporated into this specification by this reference;

Amine solutions that have an amine vapour pressure that is less than 10% of the $CO_2$ partial process both determined at the $CO_2$-desorber exit would be acceptable to use.

Further optimisation for different absorption liquids and under varying process conditions will entail a trade-off between power consumption for compression and lean loading requirement. A low lean loading will be beneficial for the $CO_2$-absorption process, resulting in higher mass transfer and therefore smaller equipment. However, this entails a deeper degree of absorbent regeneration that results in a higher specific power consumption.

The presence of amine vapours will result in co-absorption of $CO_2$ and amines into the condensed water, which results in part removal of the $CO_2$ due to the reaction with amine. If the amine vapour pressure is small compared to the $CO_2$ pressure, for example 10%, this loss is acceptable.

The compression arrangements in the systems shown in FIGS. 1(*a*) to 4 can be single stage or multi-stage with heat recovered from the intercoolers between each stage. Typical compression ratios will be between 1.1 and 10 for each stage. As explained previously, the compression ratio is dependent on the steam/$CO_2$ ratio in the exit stream and the requirements stemming from the uses of the $CO_2$-product. In the range of steam fractions 0.8 to 0.999 in the exit stream a higher compression ratio would generate more sensible heat that is most beneficial for lower zone range, whereas a low compression ratio would be most effective at the higher zone range. These considerations might be overruled by the requirement to deliver $CO_2$ at elevated pressure in which case a high compression ratio is desirable regardless of the steam/$CO_2$ ratio. This will be the case if the $CO_2$ is sent to be transported as supercritical liquid to a geological storage reservoir.

It should be appreciated that further process steps or stages may also be included in the concepts described above. For example, the target gas and water/water vapour phase from line 250 (FIG. 1(*b*) and line 350 (FIGS. 2, 3 and 4) may include minor amounts of absorbent. Once condensed (i.e. passed through heat exchanger/condensers 215, 315, 440), the process may further include a separator (for example separator 280 in FIG. 5A or separator 380 in FIG. 5B) configured to separate the absorbent from the target gas and water/water vapour). That separated absorbent can be mixed back into the lean liquid being recycled back to the absorber column 110 (FIG. 1(*a*)). It should be noted that this additional stage may entail a deeper degree of absorbent regeneration that results in a higher specific power consumption.

EXAMPLES

The following examples were developed using a process model developed in ProTreat® simulator—a process simulator tool for gas treating available from Optimized Gas Treating, Inc. (OGT), Buda, Texas, United States of America.

Example 1—Concept 1

Figure 5A:
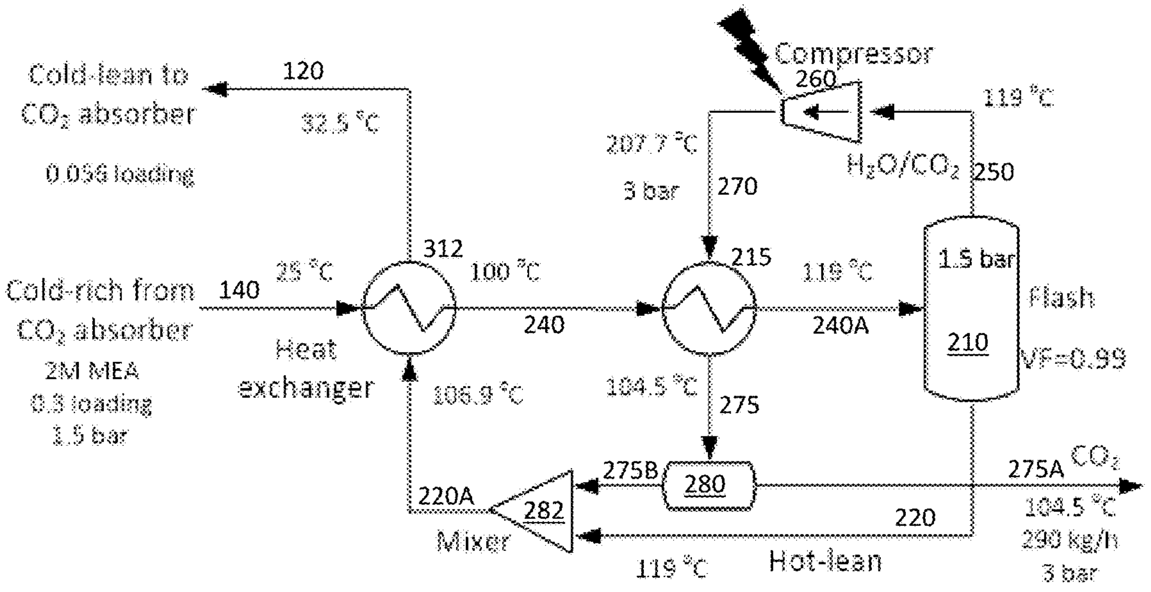
FIG. 5A illustrates one process example of the present invention illustrating absorbent (MEA=mono-ethanolamine) regeneration using vapour compression of flashed gases ($CO_2$ and steam) with subsequent heat transfer to rich liquid.

An example of absorbent regeneration system based on concept 1 (FIG. 1(*b*)) is provided in FIG. 5A for a process that uses an aqueous 2M Monoethanolamine (MEA) solution. The same reference numerals have been used in FIG. 5A for like features as used in FIGS. 1(*a*) and 1(*b*).

The process model was developed in ProTreat® discussed above based in the process flow diagram provided in FIG. 5A. In the model, the rich liquid 140 coming from the absorber 110 was determined to have a $CO_2$-loading of 0.3 mol/mol when capturing $CO_2$ from the air. The rich solution 140 was heated up in two heat exchangers 312 and 215 and subsequently sent to a flash vessel 210 in which vapour was released at 1.5 bar in vapour stream 250. The vapour stream 250, having a steam fraction of 0.99, was subsequently compressed in compressor 260 to 3 bar with the temperature of the vapour mixture increased to 208° C. The vapour is partially condensed in condenser/heat exchanger 215, and heat is transferred to the incoming rich absorption liquid. That condensed vapour stream passes into separator 280 which separates $CO_2$/water (line 275A) and any absorbent liquid (line 275B). The absorbent liquid is mixed into the hot-lean liquid 220 through mixer 282 to form a mixed hot-lean liquid 220A. After the flash the lean liquid leaves the flash vessel 210 having a lean loading of 0.056 mol/mol and passes through heat exchanger 312 transferring heat to the incoming rich solution 140 and is then recycled back to the absorber to be used to capture $CO_2$ from the air.

The specific power consumption for the vapour compression (efficiency=0.8) is equal to 1.94 MWh/tonne $CO_2$.

Example 2—Concept 1

Figure 5B:
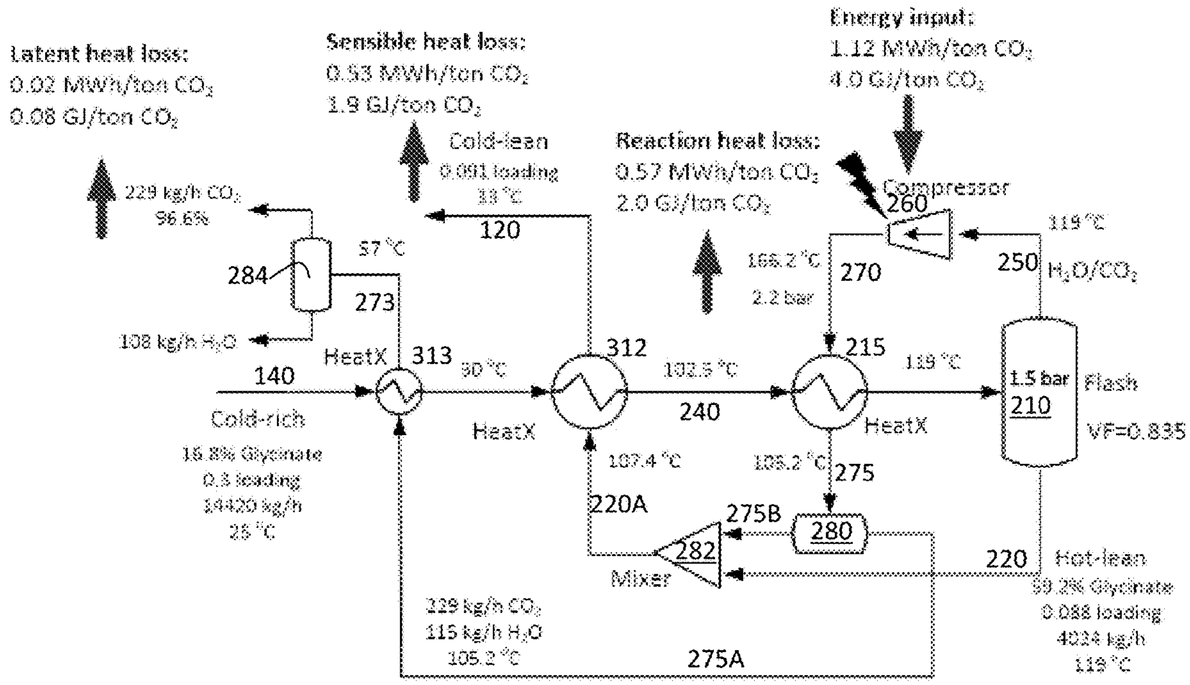
FIG. 5B illustrates one process example of the present invention illustrating absorbent (glycinate) regeneration using vapour compression of flashed gases ($CO_2$ and steam) with subsequent heat transfer to rich liquid.

A second example of the process of concept 1 (FIG. 1(*b*)) is shown in FIG. 5B. Again, the same reference numerals have been used in FIG. 5A for like features as used in FIGS. 1(*a*) and 1(*b*). As with the first example, the process was modelled in ProTreat® for an amino-acid salt solution (2M sodium glycinate) based on the process flow diagram shown in FIG. 5B.

In this example under similar process conditions as described above for Example 1, the $H_2O$ vapour fraction of the vapour stream from the flash operation was lower (0.835) together with a lower compression ratio (1.5 bar to 2.2 bar) and a lower degree of regeneration (lean liquid loading=0.088 mol/mol) was achieved. In addition, an additional heat exchanger 313 is included transferring latent heat from the condensed vapour stream 275 to the rich solution 140 from the absorber 110 (FIG. 1(*a*)). The vapour stream 275A is also shown as going through separator 284 to separate the $CO_2$ content and water content thereof.

The overall process resulted in a lower compression energy requirement of 1.12 MWh/tonne $CO_2$.

It is considered that further optimisation for different absorption liquids and under varying process conditions will entail a trade-off between power consumption for compression and lean loading requirement. A low lean loading will be beneficial for the $CO_2$-absorption process, resulting in higher mass transfer and therefore smaller equipment. However, this entails a deeper degree of absorbent regeneration that results in a higher specific power consumption.

Example 3

A process modelling example is provided where the exhaust from the desorber is compressed to 10 bar via a two-stage adiabatic compression process following the process illustrated in FIG. 2. That pressure level would be suitable to supply $CO_2$ to a methanation process in which $CO_2$ is reacted with hydrogen to produce methane.

The compression process of the process in FIG. 2 was modelled estimating the heat that was produced from the compression process by cooling down the compressed vapour to 135° C. and compared this to estimates for the reboiler duty. The reboiler duty was estimated for three cases of the heat associated with the $CO_2$ absorption process representing the relevant range reaction enthalpies. The heat for production of steam that is present with $CO_2$ was then added to this. In this modelling, two desorber exhaust temperatures, 100° C. and 120° C. at two different pressure levels are considered with the temperature of the compressed vapour decreased to 135° C. at the end of each stage with heat transferred in the reboiler as a result of the water condensation. Various steam fractions were considered, and the process simulation results (specific compressor power consumption and specific heat recovery from compressors) are presented in Table 1.

Table 1 indicates where the heat from the compression process exceeded the reboiler heat requirement—thus not providing a result for a single case but rather serving to provide the minimum steam ratio range. It was assumed that there was negligible heat requirement for heating up the absorption liquid in the desorber. Referring to Table 1, it can be seen that at higher steam fraction the specific compressor power consumption increases but also the amount of recoverable heat. At the higher inlet temperature of 120° C. and higher exit pressure of 2 bar the specific power consumption is lower than for 100° C./1 bar. The amount of heat recovery is slightly lower.

TABLE 1

Specific compressor power consumption and specific heat recovery for desorber exit vapour compression at high water content (2-stage compression; 80% efficiency compressor) and comparison with reboiler duty

| Steam fraction [—] | Inlet pressure [bar] | Inlet temperature [° C.] | Outlet pressure [bar] | Outlet temperature after cooling [° C.] | Specific compressor power consumption [MWh/tonne $CO_2$] | Specific heat recovery from compressors [GJ/ton $CO_2$] | Minimum reboiler duty; heat of reaction = 50 kJ/mol $CO_2$ [GJ/ton $CO_2$] | Minimum reboiler duty; heat of reaction = 75 kJ/mol $CO_2$ [GJ/ton $CO_2$] | Minimum reboiler duty; heat of reaction = 100 kJ/mol $CO_2$ [GJ/ton $CO_2$] |
|---|---|---|---|---|---|---|---|---|---|
| 0.50 | 1 | 100 | 10 | 135 | 0.13 | 0.89 (−) | 1.99 | 2.56 | 3.13 |
| 0.60 | 1 | 100 | 10 | 135 | 0.17 | 1.45 (−) | 2.41 | 2.98 | 3.55 |
| 0.70 | 1 | 100 | 10 | 135 | 0.23 | 2.38 (−) | 3.13 | 3.69 | 4.26 |
| 0.80 | 1 | 100 | 10 | 135 | 0.33 | 4.22 (−) | 4.55 | 5.11 | 5.68 |
| 0.90 | 1 | 100 | 10 | 135 | 0.73 | **9.98** (+) | 8.81 | 9.38 | 9.94 |
| 0.95 | 1 | 100 | 10 | 135 | 1.47 | **21.22** (+) | 17.33 | 17.90 | 18.47 |
| 0.95 | 2 | 120 | 10 | 135 | 0.97 | **19.90** (+) | 17.33 | 17.90 | 18.47 |

TABLE 2

Heat recovery (H in GJ/ton $CO_2$) for desorber exit vapour compression at high water content and compressor power consumption (P in MWh/tonne $CO_2$); single stage compression from 1 bar; 100% efficiency compressor; full latent heat recovery from water condensation

| Steam fraction [—] | Exit pressure = 1.25 bar | Exit pressure = 2.5 bar | Exit pressure = 5 bar | Exit pressure = 10 bar | Minimum reboiler duty; heat of reaction = 50 kJ/mol $CO_2$ [GJ/ton $CO_2$] | Minimum reboiler duty; heat of reaction = 75 kJ/mol $CO_2$ [GJ/ton $CO_2$] | Minimum reboiler duty; heat of reaction = 100 kJ/mol $CO_2$ [GJ/ton $CO_2$] |
|---|---|---|---|---|---|---|---|
| 0.50 | H = 0.90<br>P = 0.010 | H = 1.05<br>P = 0.043 | H = 1.24<br>P = 0.084 | H = 1.47<br>P = 0.134 | 1.99 | 2.56 | 3.13 |
| 0.60 | H = 1.33<br>P = 0.011 | H = 1.53<br>P = 0.054 | H = 1.76<br>P = 0.105 | H = 2.05<br>P = 0.168 | 2.41 | 2.98 | 3.55 |
| 0.70 | H = 2.06<br>P = 0.016 | H = 2.32<br>P = 0.072 | H = 2.63<br>P = 0.140 | H = 3.01<br>P = 0.224 | 3.13 | 3.69 | 4.26 |
| 0.80 | H = 3.52<br>P = 0.024 | H = 3.90<br>P = 0.108 | H = 4.37<br>P = 0.211 | H = 4.95<br>P = 0.336 | 4.55 | 5.11 | 5.68 |
| 0.90 | H = 7.89<br>P = 0.048 | H = 8.66<br>P = 0.216 | H = 9.60<br>P = 0.421 | **H = 10.75**<br>**P = 0.672** | 8.81 | 9.38 | 9.94 |
| 0.95 | H = 16.63<br>P = 0.095 | H = 18.17<br>P = 0.432 | **H = 20.05**<br>**P = 0.843** | **H = 22.34**<br>**P = 1.34** | 17.33 | 17.90 | 18.47 |
| 0.99 | H = 86.55<br>P = 0.48 | **H = 94.26**<br>**P = 2.16** | **H = 103.7**<br>**P = 4.21** | **H = 115.1**<br>**P = 6.72** | 85.5 | 86.1 | 86.7 |
| 0.995 | **H = 174.0**<br>**P = 0.95** | **H = 189.4**<br>**P = 4.32** | **H = 208.2**<br>**P = 8.43** | **H = 231.1**<br>**P = 13.4** | 170.7 | 171.2 | 171.9 |

TABLE 2-continued

Heat recovery (H in GJ/ton $CO_2$) for desorber exit vapour compression at high water content and compressor power consumption (P in MWh/tonne $CO_2$); single stage compression from 1 bar; 100% efficiency compressor; full latent heat recovery from water condensation

| Steam fraction [—] | Exit pressure = 1.25 bar | Exit pressure = 2.5 bar | Exit pressure = 5 bar | Exit pressure = 10 bar | Minimum reboiler duty; heat of reaction = 50 kJ/mol $CO_2$ [GJ/ton $CO_2$] | Minimum reboiler duty; heat of reaction = 75 kJ/mol $CO_2$ [GJ/ton $CO_2$] | Minimum reboiler duty; heat of reaction = 100 kJ/mol $CO_2$ [GJ/ton $CO_2$] |
|---|---|---|---|---|---|---|---|
| 0.999 | **H = 873.2** **P = 4.75** | **H = 950.3** **P = 21.6** | **H = 1044.4** **P = 42.1** | **H = 1159** **P = 67.2** | 852.6 | 853.1 | 853.7 |

Table 1 also shows the specific energy requirement for regeneration of the absorption liquids, the so-called reboiler duty. In the calculation, the regeneration energy is calculated as the sum of the reaction enthalpy requirement for $CO_2$-desorption and the latent heat of evaporation for water. In this relatively simple analysis, the heat requirement for heating up the absorption liquid after exchanging heat with the regenerated solution is ignored, assuming an ideal temperature approach for the heat exchange. The reboiler duty thus calculated is a minimum and has been based on three values for the reaction enthalpy for the chemical absorption, 50, 75, 100 KJ/mol $CO_2$, which cover the range of values for chemical absorption liquids. For water evaporation an average value of 37.5 KJ/mol $H_2O$ was used for the temperature range 100 to 120° C. The reboiler duty increases with an increase in the reaction enthalpy for the chemical absorbent chosen.

In Table 1 it can be seen that for steam fractions equal to 0.8 and lower the compressor is not able to provide sufficient energy for the regeneration of the absorption liquid. At a steam fraction of 0.9 and higher there is sufficient heat available for regeneration of absorption liquid. At higher steam fraction the overall compression energy requirement will increase, and the optimal conditions are those at which the water vapour content is high enough to provide the heat to the reboiler via the vapour compression process but not higher than that, as this would unnecessarily increase the energy requirement. The water vapour content is determined by the characteristics of the absorption liquid and will be dependent on $CO_2$-loading of the absorption liquid and temperature. For the example of compression to 10 bar it is shown that the "break-even" steam fraction would be between 0.8 and 0.9. This "break-even" point is also dependent on the compression ratio of the vapour compression process. In another example the pressure ratio for the vapour compression is varied between 1.25 and 10 assuming a single-stage compression process and the vapour exiting the desorber at 100° C./1 bar. To understand the trends and the potential for heat recovery, in this calculation a 100% compressor efficiency was used and it was assumed that all latent heat could be recovered.

Table 2 presents results the specific heat recovery (H) and the specific compressor power consumption (P) for four compression ratios (1.25, 2.5, 5, 10) and a range of steam fractions of the exit vapour from the $CO_2$ desorber (0.5 to 0.999). Also presented are the estimated minimum specific reboiler duties for the $CO_2$-desorption process for three values of the reaction enthalpy. These reboiler duties can be compared with the heat recovery from the compression process (H). The values where the heat from the compression process exceeds the reboiler duty for all values of the reboiler duty are shown in bold for clarity. At low compression ratio the steam fraction needs to be high for to achieve high enough heat recovery from the compression process, e.g. at 1.25 bar pressure after compression, the steam fraction needs to be at least 0.99 to 0.995 to achieve. At 10 bar pressure after compression the steam fraction can be somewhat lower, i.e. more than 0.8 to 0.9 to achieve break-even. Higher steam fractions lead to steep increases in the specific power consumption as shown in Table 2. This indicates that careful optimisation is needed for the specific absorption liquid, $CO_2$-loading and regeneration process design to determine the optimum compression conditions that will minimise compression power consumption and achieve sufficient heat recovery from the compression process.

The simplified analysis here indicates that for the relevant pressure conditions of 1.25 to 10 bar the steam fraction will need to be in the range 0.8 to 0.995 to achieve the situation where the heat of the compression process covers is sufficient to supply the reboiler duty. At lower vapour fraction the heat generated by the compression will be insufficient to fully cover the reboiler duty. At higher vapour fractions the equipment might be become quite large and expensive as large amounts of water vapour need to be treated relative to the amount of $CO_2$. Also, the compressor power consumption increases quite rapidly which is not desired.

Example 4—Concept 4

The process configuration shown in FIG. 4 was modelled in Protreat® for a range of conditions with differing degrees of regeneration using a 2M sodium glycinate as a representative amino-acid salt solution.

The absorption liquid entering the regeneration system had a liquid loading equivalent to 0.3 mol/mol that can be achieved through $CO_2$-capture from the air. The desorber was operated at a pressure of 150 kPa (1.5 bar) under isothermal conditions (~112° C.) for all process simulations. The steam compressor was assumed to have an 80% efficiency. The rich solution 140 was preheat in heat exchangers 312 using the hot lean liquid exiting the bottom of the desorber column 310. The heated rich liquid is subsequently fed into desorber column 310.

Figure 6A:
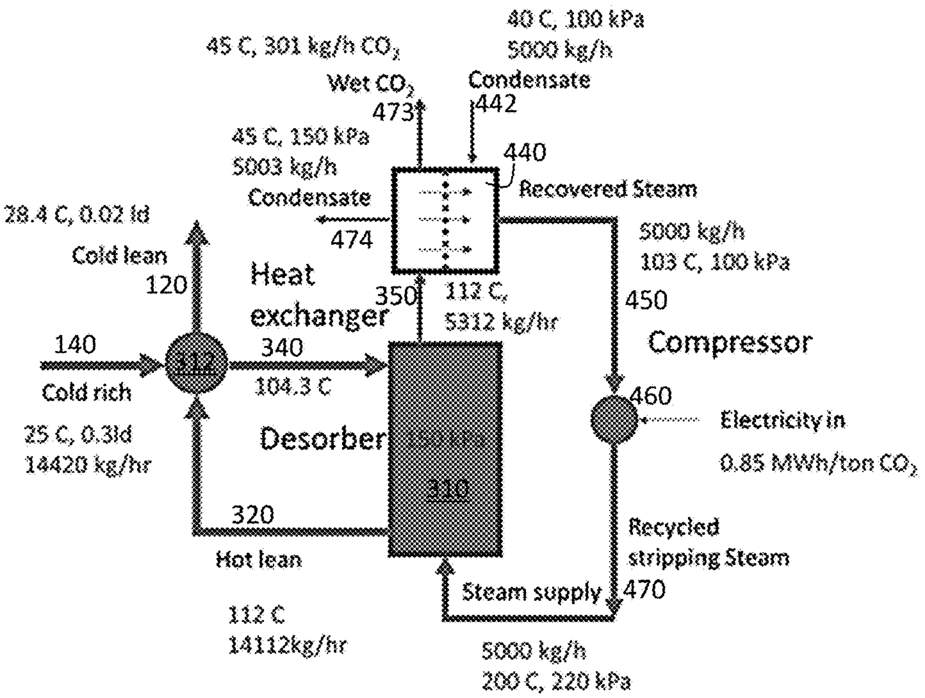
FIG. 6A illustrates one process example of the present invention illustrating process flow sheet and conditions for absorbent regeneration using vapour compression of steam raised by heat exchange with desorber off-gases ($CO_2$ and steam) with subsequent injection of steam into desorber (lean loading=0.02).
Figure 6B:
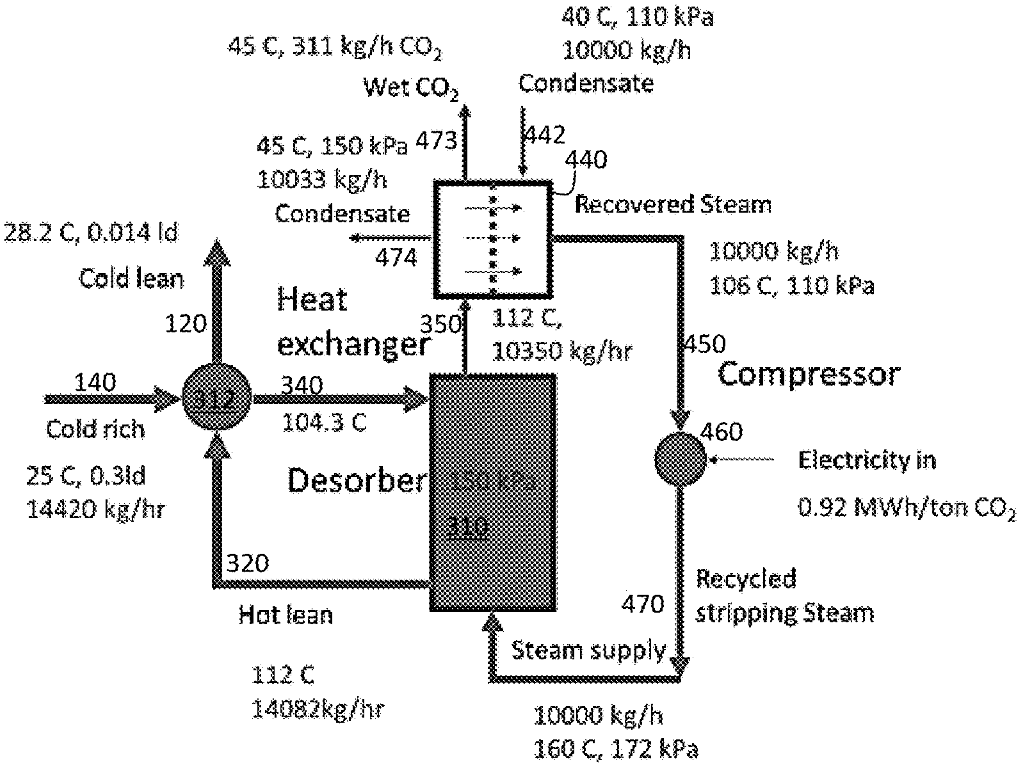
FIG. 6B illustrates one process example of the present invention illustrating process flow sheet and conditions for absorbent regeneration using vapour compression of steam raised by heat exchange with desorber off-gases ($CO_2$ and steam) with subsequent injection of steam into desorber (lean loading=0.014).
Figure 6C:
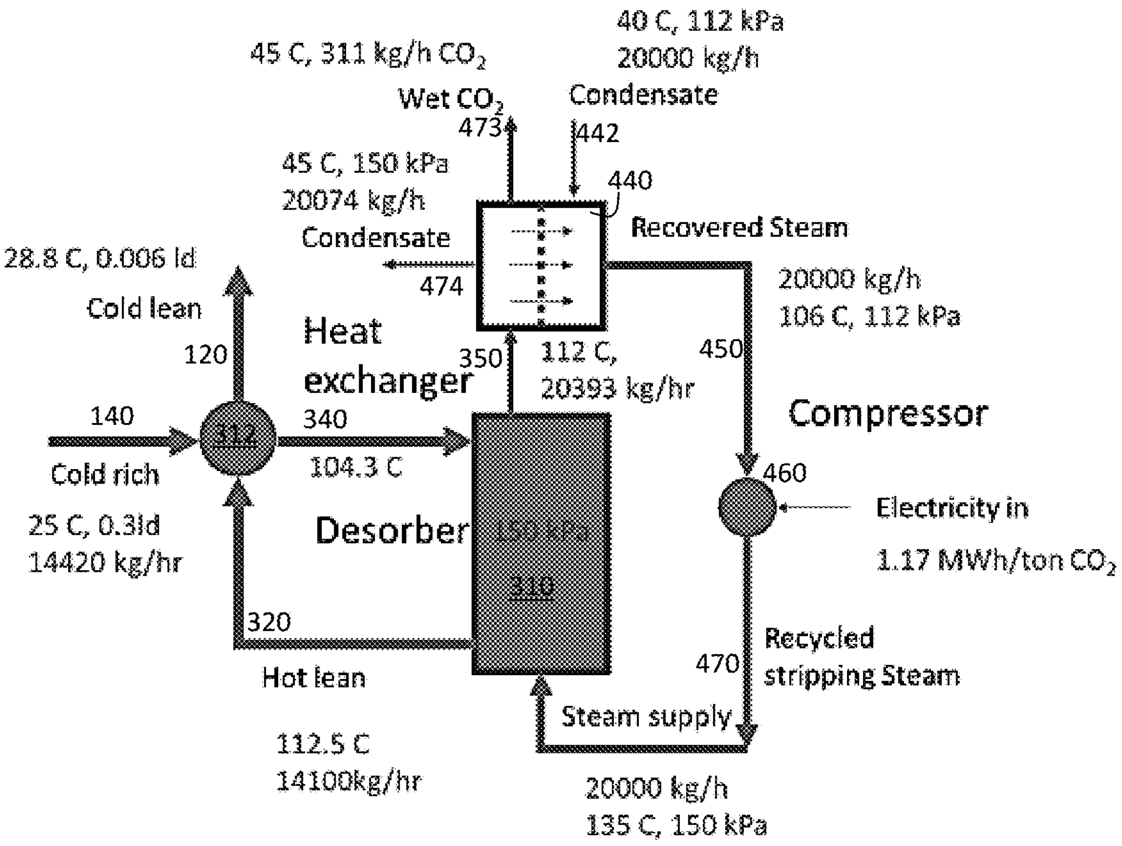
FIG. 6C illustrates one process example of the present invention illustrating process flow sheet and conditions for absorbent regeneration using vapour compression of steam raised by heat exchange with desorber off-gases ($CO_2$ and steam) with subsequent injection of steam into desorber (lean loading=0.006).

The resulting process flow sheets are given in FIGS. 6A, 6B, 6C for lean loadings equal to 0.02, 0.014 and 0.006. The flow sheets indicated the modelled conditions. The results are also summarised in Table 3. It is noted that the same reference numerals have been used in FIG. 6A, 6B, 6C for like features as used in FIGS. 1(*a*) and 4.

TABLE 3

Results summary for absorbent regeneration using vapour compression steam raised by heat exchange with desorber off-gases with subsequent injection of steam into desorber

| Lean loading [mol/mol] | Steam fraction in $CO_2$-desorber exit | Compression ratio | Specific compression power consumption [MWh/tonne $CO_2$] |
|---|---|---|---|
| 0.006 | 0.994 | 1.34 | 1.17 |
| 0.016 | 0.988 | 1.55 | 0.92 |
| 0.02 | 0.977 | 2.2 | 0.85 |

Example 5—Concept 3

The process configuration shown in FIG. 3 was modelled in Protreat® for a range of conditions with differing degrees of regeneration using a 2M sodium glycinate as a representative amino-acid salt solution.

The rich absorption liquid 340 entering the regeneration system at a temperature of 104.5° C. (α=0.3, 14420 kg/hr) had a liquid loading equivalent to 0.3 mol/mol that can be achieved through $CO_2$-capture from the air. The desorber 310 was operated at a pressure of 150 kPa (1.5 bar) and a bottom temperature of 115° C. with the regenerated, lean absorption liquid 320 leaving the regeneration at a temperature of 112.2° C., (α=0.036, 14120 kg/hr) having a liquid loading equivalent to 0.036 mol/mol.

The vapour mixture leaving the desorber 350 exchanged heat with the incoming water stream 442 (@40° C., 8150 kg/h) that resulted in the production of steam 450 at a temperature of 110° C. and a pressure of 150 kPa (8150 kg/hr). $CO_2$ and condensate exit in stream 475 at 45° C., a pressure of 150 kPa ($CO_2$: 290 kg/h). This steam is compressed using the compressor 460 to 290 kPa (8150 kg/hr) with the adiabatic compression resulting in an outlet temperature of 195° C. in line 462 and condenses in the reboiler 315 at a temperature of 132.5° C. in the condensate 470 transferring heat to the absorption liquid which exits the reboiler in stream 318. The steam compressor was assumed to have an 80% efficiency and the electricity consumption of the process equals 1.2 MWh/tonne $CO_2$.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A process of regeneration of a capture medium rich in a captured target gas comprising:

heating a target gas rich capture medium comprising an absorbent medium, absorbed target gas and water using thermal energy, thereby facilitating separation of the absorbed target gas from the capture medium into a gas containing vapour phase and a heated lean capture medium, said gas containing vapour phase comprising the target gas and water vapour having a steam fraction of at least 0.8;

compressing at least one of: the gas containing vapour phase; or a vapour phase thermally associated with the gas containing vapour phase, to form a compressed vapour; and using the compressed vapour as a source of thermal energy to heat the target gas rich capture medium.

2. A process according to claim 1, wherein the gas containing vapour phase comprises the target gas and water vapour having a steam fraction of between 0.8 to 0.999.

3. A process according to claim 1, wherein the separation of the absorbed target gas from the capture medium into a gas containing vapour phase comprises one of: flash vaporisation, vaporisation, boiling, stripping or a combination thereof, and optionally, the separation of the absorbed target gas from the capture medium into a gas containing vapour phase occurs in one of: a flash vessel or a desorption vessel, and wherein, optionally, the desorption vessel includes a reboiler.

4. A process according to claim 1, wherein the vapour phase thermally associated with the gas containing vapour phase comprises a heat transfer fluid, and the process further includes:

heating a heat transfer fluid using the gas containing vapour phase to produce a heated heat transfer fluid, wherein, optionally, the heat transfer fluid comprises a water rich phase, and the process further includes heating the water rich phase using the gas containing vapour phase to produce a steam vapour phase, and wherein, optionally, the water rich phase is heated using thermal heat exchange with the gas containing vapour phase.

5. A process according to claim 1, wherein the compressed vapour is used to heat the target gas rich capture medium using at least one of:

thermal heat exchange with the target gas rich capture medium; or condensing heat exchange with the target gas rich capture medium, thereafter producing a condensed target gas and water phase, and wherein, optionally, the process further comprises using the condensed target gas and water phase as a further source of thermal energy for heating the target gas rich capture medium, and wherein, optionally, the condensed target gas and water phase composition includes a capture medium content, and the process further includes separating the capture medium from the target gas and water phase to form a separated capture medium, and the separated capture medium is optionally mixed with the heated lean capture medium.

6. A process according to claim 1, wherein the vapour phase thermally associated with the gas containing vapour phase comprises a steam vapour phase, and the steam vapour phase is fed into the target gas rich capture medium, thereby directly heating the target gas rich capture medium.

7. A process according to claim 1, wherein the heated lean capture medium is used to heat the target gas rich capture medium using:

heat exchange with the target gas rich capture medium.

8. A process according to claim 1, wherein the compressing step comprises a single compression stage or a multi-stage compression stage, and optionally the compressing step comprises a multi-stage compression stage with heat recovered from at least one intercooler located between each compression stage, and optionally each compression stage has a compression ratio of between 1.1 and 10.

9. A process according to claim 1, wherein:

the target gas comprises at least one of $CO_2$, $H_2S$, HCl, HF, $SO_2$, $SO_3$ or $NO_x$; and optionally the absorbent medium comprises at least one of:

a salt solution; or an amine solution that has an amine vapour pressure that is less than 10% of the $CO_2$ partial pressure in the gas rich capture medium.

10. A process according to claim 9, wherein the absorbent medium comprises an alkaline salt solution or an amino acid salt solution.

11. A process according to claim 1, wherein the compressed vapour is used as a first source of thermal energy to provide thermal energy required to heat the target gas rich capture medium, and the heated lean capture medium is used as a second source of thermal energy to provide thermal energy required to heat the target gas rich capture medium.

12. A process according to claim 1, wherein the gas containing vapour phase comprises the captured target gas and water vapour having a steam fraction of between 0.8 to 0.9.

13. A process according to claim 1, wherein the gas containing vapour phase comprises the captured target gas and water vapour having a steam fraction of between 0.8 to 0.85.

14. An apparatus for regeneration of a capture medium rich in a captured target gas and recovery of captured gas therefrom comprising:

a process vessel including a process volume;

a supply conduit to feed gas rich capture medium into the process volume;

at least one heating arrangement configured to heat the gas rich capture medium to a temperature that facilitates separation of an absorbed target gas to separate from the capture medium into a gas containing vapour phase comprising the target gas and water vapour having a steam fraction of at least 0.8, and to produce a heated lean capture medium;

a vapour recompression system fluidly connected to the process volume to receive and compress the gas containing vapour phase from at least one of: the process volume; or a vapour phase thermally associated with the gas containing vapour phase, and form a compressed vapour;

a compressed vapour supply conduit to supply compressed vapour to the at least one heating arrangement as a source of thermal energy to heat the target gas rich capture medium.

15. An apparatus according to claim 14, further comprising: a heated lean capture medium supply conduit to supply heated lean capture medium to the at least one heating arrangement as a second source of thermal energy to heat the target gas rich capture medium.

16. An apparatus according to claim 14, wherein the gas containing vapour phase comprises the target gas and water vapour having a steam fraction of between 0.8 to 0.999.

17. An apparatus according to claim 14, wherein the process vessel comprises one of: flash vaporisation vessel, vaporisation vessel, boiling vessel, desorption vessel or a combination thereof.

18. An apparatus according to claim 14, wherein the at least one heating arrangement includes a heating arrangement configured to heat the feed gas rich capture medium in the process volume.

19. An apparatus according to claim 14, wherein the at least one heating arrangement comprises at least one heat exchanger, condensing heat exchanger, or at least one mixing heat exchanger; and optionally the heat arrangement includes at least one of:

a reboiler, configured to heat the target gas rich capture medium in the reboiler; and at least one preheating arrangement configured to heat the feed gas rich capture medium prior to the feed gas rich capture medium being fed into the process volume, and optionally wherein at least the heated lean capture medium is used to heat the target gas rich capture medium in the at least one preheating arrangement.

20. An apparatus according to claim 14, wherein the process vessel comprises a flash vaporisation vessel, and the compressed vapour is used to heat the target gas rich capture medium in an at least one preheating arrangement.

21. An apparatus according to claim 14, wherein the vapour phase thermally associated with the gas containing vapour phase comprises a steam vapour phase, and the apparatus further includes an indirect heat exchanger arrangement configured to heat a water rich phase using the gas containing vapour phase to produce said steam vapour phase, and optionally wherein the indirect heat exchanger comprises at least one heat exchanger, at least one condensing heat exchanger, or at least one mixing heat exchanger.

22. An apparatus according to claim 14, wherein the at least one heating arrangement includes:

a first preheating arrangement comprising a condensing heat exchanger configured to transfer energy from the compressed vapour to heat the feed gas rich capture medium prior to the feed gas rich capture medium being fed into the process volume and a preheating arrangement, and a second preheating arrangement configured to transfer thermal energy from the target gas and water phase after passing through the condensing heat exchanger to heat the feed gas rich capture medium prior to the feed gas rich capture medium being fed into the process volume.

23. An apparatus according to claim 14, wherein the process vessel comprises a desorption vessel, and the at least one heating arrangement comprises at least one mixing heat exchanger configured to heat the target gas rich capture medium by feeding the compressed vapour into the target gas rich capture medium in the process volume of the desorption vessel or a volume fluidly connected to said process volume.

24. An apparatus according to claim 14, wherein the gas containing vapour phase comprises the captured target gas and water vapour having a steam fraction of between 0.8 to 0.9.

25. An apparatus according to claim 14, wherein the gas containing vapour phase comprises the captured target gas and water vapour having a steam fraction of between 0.8 to 0.85.

* * * * *